(12) United States Patent
Donnally et al.

(10) Patent No.: US 11,035,183 B2
(45) Date of Patent: Jun. 15, 2021

(54) DEVICES, SYSTEMS, AND METHODS FOR TOP DRIVE CLEARING

(71) Applicant: NATIONAL OILWELL VARCO, L.P., Houston, TX (US)

(72) Inventors: Robert Benjamin Donnally, Plano, TX (US); Xi Lin Liu, Shanghai (CN); Jay John Thiessen, Edmonton (CA)

(73) Assignee: NATIONAL OILWELL VARCO, L.P., Houston, TX (US)

( * ) Notice: Subject to any disclaimer, the term of this patent is extended or adjusted under 35 U.S.C. 154(b) by 0 days.

(21) Appl. No.: 16/431,540

(22) Filed: Jun. 4, 2019

(65) Prior Publication Data

US 2020/0040673 A1  Feb. 6, 2020

Related U.S. Application Data

(60) Provisional application No. 62/797,042, filed on Jan. 25, 2019.

(30) Foreign Application Priority Data

Aug. 3, 2018 (CN) .......................... 201810880362.2
Nov. 28, 2018 (CN) .......................... 201811449262.0

(51) Int. Cl.
*E21B 3/04* (2006.01)
*E21B 7/02* (2006.01)
(Continued)

(52) U.S. Cl.
CPC ........... *E21B 19/084* (2013.01); *B25J 9/1628* (2013.01); *B25J 11/00* (2013.01); *E21B 3/02* (2013.01);
(Continued)

(58) Field of Classification Search
CPC ............... E21B 3/04; E21B 7/02; E21B 7/028
See application file for complete search history.

(56) References Cited

U.S. PATENT DOCUMENTS

| 1,818,278 A | 8/1931 | Siler |
| 2,531,930 A | 11/1950 | Woolslayer et al. |

(Continued)

FOREIGN PATENT DOCUMENTS

| CA | 2911388 A1 | 11/2014 |
| CA | 2855105 A1 | 12/2015 |

(Continued)

OTHER PUBLICATIONS

"International Application U.S. Appl. No. PCT/US2019/044974, International Search Report dated Oct. 24, 2019", 6 pgs.

(Continued)

*Primary Examiner* — Cathleen R Hutchins
(74) *Attorney, Agent, or Firm* — Schwegman Lundberg & Woessner, P.A.

(57) ABSTRACT

Systems and methods for clearing a top drive from an operational area of the mast such that operations may be performed along the rail without interference from the top drive. Systems and methods of the present disclosure provide for arranging the top drive in a parked configuration outside of, or generally behind, the mast. A guide rail may be arranged within an operational area of a mast and may have a pair of interchangeable rail sections, each of which may be configured for arrangement in either an operating configuration, where the rail section may be positioned within the operational area of the mast to form part of the rail, or a parked configuration, where the rail section may be positioned outside of the operational area. Each interchangeable rail section may be pivotable about an axis and may be arranged on a pivotable gate of the mast.

20 Claims, 14 Drawing Sheets

(51) Int. Cl.
| | |
|---|---|
| *E21B 19/084* | (2006.01) |
| *E21B 19/14* | (2006.01) |
| *E21B 3/02* | (2006.01) |
| *E21B 15/00* | (2006.01) |
| *B25J 11/00* | (2006.01) |
| *B25J 9/16* | (2006.01) |
| *E21B 19/06* | (2006.01) |
| *B25J 13/08* | (2006.01) |

(52) U.S. Cl.
CPC .............. *E21B 15/00* (2013.01); *E21B 19/06* (2013.01); *E21B 19/14* (2013.01); *B25J 13/081* (2013.01); *B25J 13/086* (2013.01); *B25J 13/087* (2013.01)

(56) References Cited

U.S. PATENT DOCUMENTS

| | | |
|---|---|---|
| 2,615,681 A | 10/1952 | True |
| 2,735,556 A | 2/1956 | Stone |
| 2,885,096 A | 5/1959 | De Jarnett |
| 2,946,464 A | 7/1960 | Guier |
| 3,225,949 A | 12/1965 | Erickson et al. |
| 3,272,365 A | 9/1966 | Stevens |
| 3,533,516 A | 10/1970 | Guier |
| 3,615,027 A | 10/1971 | Ham |
| 3,747,789 A | 7/1973 | Shipley et al. |
| 3,768,663 A | 10/1973 | Turner et al. |
| 3,840,128 A | 10/1974 | Swoboda et al. |
| 3,877,583 A | 4/1975 | Bokenkamp |
| 3,921,823 A | 11/1975 | Bourree et al. |
| 3,976,207 A | 8/1976 | Schultz |
| 3,994,350 A | 11/1976 | Smith et al. |
| 4,042,123 A | 8/1977 | Sheldon et al. |
| 4,117,941 A | 10/1978 | Mccleskey, Jr. et al. |
| 4,126,348 A | 11/1978 | Palmer |
| 4,274,778 A | 6/1981 | Putnam et al. |
| 4,289,442 A | 9/1981 | Stevens |
| 4,348,920 A | 9/1982 | Boyadjieff |
| 4,397,605 A | 8/1983 | Cowgill et al. |
| 4,531,875 A | 7/1985 | Krueger |
| 4,591,006 A | 5/1986 | Hutchison et al. |
| 4,621,974 A | 11/1986 | Krueger |
| 4,680,519 A | 7/1987 | Chand et al. |
| 4,715,761 A | 12/1987 | Berry et al. |
| 4,738,321 A | 4/1988 | Olivier |
| 4,846,357 A | 7/1989 | Sholl et al. |
| 5,038,871 A | 8/1991 | Dinsdale |
| 5,211,251 A | 5/1993 | Woolslayer |
| 5,813,286 A | 9/1998 | Hansen |
| 5,921,329 A * | 7/1999 | Armstrong ............... E21B 15/00 175/203 |
| 6,047,771 A | 4/2000 | Roeynestad |
| 6,260,646 B1 | 7/2001 | Fernandez et al. |
| 6,412,576 B1 | 7/2002 | Meiners |
| 7,137,616 B2 | 11/2006 | Kysely |
| 7,249,639 B2 | 7/2007 | Belik |
| 7,370,707 B2 | 5/2008 | McDaniel et al. |
| 7,726,929 B1 | 6/2010 | Orgeron |
| 7,905,311 B2 | 3/2011 | Brown |
| 7,946,795 B2 | 5/2011 | Orgeron |
| 7,984,757 B1 | 7/2011 | Keast et al. |
| 8,074,484 B2 | 12/2011 | Denkmeier et al. |
| 8,191,637 B2 * | 6/2012 | Havinga ................ E21B 19/22 166/379 |
| 8,210,269 B2 | 7/2012 | Hudson et al. |
| 8,317,448 B2 | 11/2012 | Hankins et al. |
| 8,550,761 B2 | 10/2013 | Belik et al. |
| 8,690,508 B1 | 4/2014 | Orgeron |
| 9,291,010 B1 | 3/2016 | Barnes |
| 10,384,907 B2 * | 8/2019 | Upmeier ................ B65H 57/26 |
| 10,794,126 B2 | 10/2020 | Magnuson |
| 2004/0057815 A1 | 3/2004 | Woolslayer et al. |
| 2005/0126792 A1 | 6/2005 | Berry |
| 2006/0081379 A1 | 4/2006 | Fehres et al. |
| 2006/0104747 A1 | 5/2006 | Zahn et al. |
| 2006/0124316 A1 | 6/2006 | Pietras |
| 2006/0231344 A1 | 10/2006 | Drzewiecki |
| 2006/0249292 A1 | 11/2006 | Guidry |
| 2007/0062705 A1 | 3/2007 | Schats et al. |
| 2007/0114069 A1 | 5/2007 | Hooper et al. |
| 2008/0202812 A1 | 8/2008 | Childers et al. |
| 2008/0238095 A1 | 10/2008 | Yater et al. |
| 2008/0296065 A1 | 12/2008 | Standal |
| 2009/0283324 A1 | 11/2009 | Konduc et al. |
| 2010/0193198 A1 | 8/2010 | Murray et al. |
| 2010/0303586 A1 | 12/2010 | Hankins et al. |
| 2011/0079434 A1 | 4/2011 | Belik et al. |
| 2011/0120730 A1 | 5/2011 | Clasen et al. |
| 2011/0226485 A1 | 9/2011 | Seneviratne et al. |
| 2012/0018222 A1 | 1/2012 | Hankins et al. |
| 2013/0075114 A1 | 3/2013 | Dekker et al. |
| 2013/0142607 A1 | 6/2013 | Ditzler |
| 2014/0054089 A1 | 2/2014 | Sondervik |
| 2014/0097027 A1 | 4/2014 | Marica et al. |
| 2014/0145408 A1 | 5/2014 | Midas et al. |
| 2014/0202769 A1 | 7/2014 | Magnuson |
| 2015/0053424 A1 | 2/2015 | Wiens et al. |
| 2015/0232272 A1 | 8/2015 | Magnuson |
| 2015/0275596 A1 * | 10/2015 | Hickie .................. E21B 19/165 166/380 |
| 2016/0060979 A1 | 3/2016 | Magnuson |
| 2016/0115745 A1 | 4/2016 | Bisel |
| 2016/0145954 A1 * | 5/2016 | Helms ..................... E21B 19/06 175/57 |
| 2016/0160586 A1 | 6/2016 | Keogh et al. |
| 2016/0168929 A1 | 6/2016 | Magnuson et al. |
| 2016/0201408 A1 | 7/2016 | Little et al. |
| 2017/0234088 A1 | 8/2017 | Orr et al. |
| 2018/0245408 A1 | 8/2018 | Keogh et al. |
| 2018/0328112 A1 | 11/2018 | Berry et al. |
| 2018/0334865 A1 | 11/2018 | Miller et al. |
| 2019/0145197 A1 | 5/2019 | Callaghan |
| 2019/0309585 A1 | 10/2019 | Miller et al. |
| 2020/0040674 A1 | 2/2020 | Mckenzie et al. |

FOREIGN PATENT DOCUMENTS

| | | |
|---|---|---|
| CN | 108266139 A | 7/2018 |
| CN | 110792399 A | 2/2020 |
| EP | 1953334 A2 | 8/2008 |
| GB | 2091788 A | 8/1982 |
| GB | 2532267 A | 5/2016 |
| JP | H09-137689 A | 5/1997 |
| NO | 20151648 A1 | 12/2015 |
| WO | WO-8800274 A2 | 1/1988 |
| WO | WO-9958811 A1 | 11/1999 |
| WO | WO-0123701 A1 | 4/2001 |
| WO | WO-2004018829 A1 | 3/2004 |
| WO | WO-2013082172 A1 | 6/2013 |
| WO | WO-2014179730 A1 | 11/2014 |
| WO | WO-2015/043740 A1 | 4/2015 |
| WO | WO-2016024859 A1 | 2/2016 |
| WO | WO-2016197255 A1 | 12/2016 |
| WO | WO-2017039996 A1 | 3/2017 |
| WO | WO-2017087595 A1 | 5/2017 |
| WO | WO-2017190120 A1 | 11/2017 |
| WO | WO-2017193204 A1 | 11/2017 |
| WO | WO-2019195651 A1 | 10/2019 |
| WO | WO-2020/028853 A9 | 2/2020 |
| WO | WO-2020028852 A1 | 2/2020 |
| WO | WO-2020028853 A1 | 2/2020 |
| WO | WO-2020028856 A1 | 2/2020 |
| WO | WO-2020028858 A1 | 2/2020 |
| WO | WO-2020151386 A1 | 7/2020 |
| WO | WO-2020172407 A1 | 8/2020 |

OTHER PUBLICATIONS

"International Application Serial No. PCT/US2019/044974, Written Opinion dated Oct. 24, 2019", 6 pgs.
"International Application Serial No. PCT/US2019/044976, International Search Report dated Oct. 18, 2019", 5 pgs.

(56) References Cited

OTHER PUBLICATIONS

"International Application Serial No. PCT/US2019/044976, Written Opinion dated Oct. 18, 2019", 8 pgs.
"International Application Serial No. PCT/US2019/044979, International Search Report dated Oct. 22, 2019", 6 pgs.
"International Application Serial No. PCT/US2019/044979, Written Opinion dated Oct. 22, 2019", 7 pgs.
"International Application Serial No. PCT/US2019/044983, International Search Report dated Oct. 22, 2019", 5 pgs.
"International Application Serial No. PCT/US2019/044983, Written Opinion dated Oct. 22, 2019", 6 pgs.
U.S. Appl. No. 16/098,160, filed Nov. 1, 2018, System and Method for Offline Standbuilding.
U.S. Appl. No. 16/375,927, filed Apr. 5, 2019, System for Handling Tubulars on a Rig.
U.S. Appl. No. 16/836,365, filed Mar. 31, 2020, Robotic Pipe Handling From Outside a Setback Area.
U.S. Appl. No. 16/786,345, filed Feb. 10, 2020, Quick Coupling Drill Pipe Connector.
"U.S. Appl. No. 16/098,160, Advisory Action dated Jul. 22, 2020", 5 pgs.
"U.S. Appl. No. 16/098,160, Examiner Interview Summary dated Jun. 23, 2020", 3 pgs.
"U.S. Appl. No. 16/098,160, Final Office Action dated Apr. 30, 2020", 7 pgs.
"U.S. Appl. No. 16/098,160, Non Final Office Action dated Sep. 30, 2019", 8 pgs.
"U.S. Appl. No. 16/098,160, Preliminary Amendment filed Nov. 1, 2018", 5 pgs.
"U.S. Appl. No. 16/098,160, Response filed Jan. 30, 2020 to Non Final Office Action dated Sep. 30, 2019", 8 pgs.
"U.S. Appl. No. 16/098,160, Response filed Jun. 30, 2020 to Final Office Action dated Apr. 30, 2020", 8 pgs.
"U.S. Appl. No. 16/098,160, Response filed Aug. 24, 2020 to Advisory Action dated Jul. 22, 2020", 9 pgs.
"U.S. Appl. No. 16/375,927, Advisory Action dated Aug. 11, 2020", 6 pgs.
"U.S. Appl. No. 16/375,927, Examiner Interview Summary dated Apr. 24, 2020", 3 pgs.
"U.S. Appl. No. 16/375,927, Final Office Action dated Jun. 5, 2020", 10 pgs.
"U.S. Appl. No. 16/375,927, Non Final Office Action dated Feb. 28, 2020", 9 pgs.
"U.S. Appl. No. 16/375,927, Response filed May 27, 2020 to Non Final Office Action dated Feb. 28, 2020", 10 pgs.
"U.S. Appl. No. 16/375,927, Response filed Aug. 3, 2020 to Final Office Action dated Jun. 5, 2020", 11 pgs.
"U.S. Appl. No. 16/375,927, Response filed Sep. 8, 2020 to Advisory Action dated Aug. 11, 2020".
"Canadian Application Serial No. 3,022,888, Voluntary Amendment filed Jul. 12, 2019", 10 pgs.
"International Application Serial No. PCT/CA2017/000125, International Preliminary Report on Patentability dated Nov. 22, 2018", 6 pgs.
"International Application Serial No. PCT/CA2017/000125, International Search Report dated Aug. 14, 2017", 3 pgs.
"International Application Serial No. PCT/CA2017/000125, Written Opinion dated Aug. 14, 2017", 4 pgs.
"International Application Serial No. PCT/CN2019/124443, International Search Report dated Mar. 5, 2020", 4 pgs.
"International Application Serial No. PCT/CN2019/124443, Written Opinion dated Mar. 5, 2020", 4 pgs.
"International Application Serial No. PCT/US2019/025942, International Search Report dated Jun. 27, 2019", 4 pgs.
"International Application Serial No. PCT/US2019/025942, Response filed Feb. 5, 2020 to Written Opinion dated Feb. 27, 2019", 14 pgs.
"International Application Serial No. PCT/US2019/025942, Response filed Apr. 23, 2020 to Written Opinion dated Apr. 23, 2020", 14 pgs.
"International Application Serial No. PCT/US2019/025942, Written Opinion dated Feb. 24, 2020", 8 pgs.
"International Application Serial No. PCT/US2019/025942, Written Opinion dated Jun. 27, 2019", 9 pgs.
"International Application Serial No. PCT/US2019/025942, Written Opinion dated Jul. 23, 2020", 5 pgs.
"International Application Serial No. PCT/US2019/044974, Response filed Jun. 2, 2020 to Written Opinion dated Oct. 24, 2019", 13 pgs.
"International Application Serial No. PCT/US2019/044974, Response filed Aug. 18, 2020 to Written Opinion dated Jun. 19, 2020", 4 pgs.
"International Application Serial No. PCT/US2019/044974, Written Opinion dated Jun. 19, 2020", 7 pgs.
"International Application Serial No. PCT/US2019/044976, Response filed Jun. 3, 2020 to Written Opinion dated Oct. 18, 2019", 11 pgs.
"International Application Serial No. PCT/US2019/044976, Response filed Aug. 25, 2020 to Written Opinion dated Jun. 26, 2020", 3 pgs.
"International Application Serial No. PCT/US2019/044976, Written Opinion dated Jun. 26, 2020", 4 pgs.
"International Application Serial No. PCT/US2019/044979, Response filed Jun. 3, 2020 to Written Opinion dated Oct. 22, 2019", 12 pgs.
"International Application Serial No. PCT/US2019/044979, Response filed Aug. 25, 2020 to Written Opinion dated Jun. 26, 2020", 3 pgs.
"International Application Serial No. PCT/US2019/044979, Written Opinion dated Jun. 26, 2020", 4 pgs.
"International Application Serial No. PCT/US2020/019039, International Search Report dated May 15, 2020", 2 pgs.
"International Application Serial No. PCT/US2020/019039, Written Opinion dated May 15, 2020", 4 pgs.
"U.S. Appl. No. 16/098,160, Non Final Office Action dated Oct. 6, 2020", 8 pgs.
"U.S. Appl. No. 16/098,160, Response filed Jan. 6, 2021 to Non Final Office Action dated Oct. 6, 2020", 7 pgs.
"U.S. Appl. No. 16/375,927, Examiner Interview Summary dated Dec. 7, 2020", 7 pgs.
"U.S. Appl. No. 16/375,927, Non Final Office Action dated Sep. 24, 2020", 10 pgs.
"U.S. Appl. No. 16/375,927, Notice of Allowance dated Jan. 1, 2021", 8 pgs.
"U.S. Appl. No. 16/375,927, Response filed Dec. 16, 2020 to Non Final Office Action dated Sep. 24, 2020", 8 pgs.
"International Application Serial No. PCT/US2019/025942, International Preliminary Report on Patentability dated Oct. 30, 2020", 7 pgs.
"International Application Serial No. PCT/US2019/025942, Response filed Sep. 22, 2020 to Written Opinion dated Jul. 23, 2020", 4 pgs.
"International Application Serial No. PCT/US2019/044974, International Preliminary Report on Patentability dated Nov. 11, 2020", 7 pgs.
"International Application Serial No. PCT/US2019/044976, Written Opinion dated Nov. 6, 2020", 6 pgs.
"International Application Serial No. PCT/US2019/044979, International Preliminary Report on Patentability dated Nov. 18, 2020", 7 pgs.
"International Application Serial No. PCT/US2019/124443, Response filed Nov. 24, 2020 to Written Opinion dated Mar. 5, 2020", 10 pgs.
"U.S. Appl. No. 16/375,927, Corrected Notice of Allowability dated Jan. 26, 2021", 2 pgs.
"U.S. Appl. No. 16/836,365, Non-Final Office Action dated Jan. 25, 2021", 8 pgs.

\* cited by examiner

DEVICES, SYSTEMS, AND METHODS FOR TOP DRIVE CLEARING

CROSS-REFERENCE TO RELATED APPLICATIONS

This application claims priority to U.S. Provisional Application No. 62/797,042, entitled Hoist System Capable of Parking a Top Drive and Including an Elevator and a Claw independently Operated and Automated Robotic Arms for Handling Tubulars on a Drilling Rig, and filed Jan. 25, 2019; Chinese Application No. 201811449262.0, entitled Hoist System Capable of Parking a Top Drive and Including an Elevator and a Claw Independently Operated for Handling Tubulars on a Drilling Rig, and filed Nov. 28, 2018; and Chinese Application No. 201810880362.2, entitled Hoist System Capable of Parking a Top Drive and Including an Elevator and a Claw Independently Operated and Automated Robotic Arms for Handling Tubulars on a Drilling Rig, and filed Aug. 3, 2018, the content of each of which is hereby incorporated by reference herein in its entirety.

FIELD OF THE INVENTION

The present disclosure relates to a drilling rig having a top drive. In particular, the present disclosure relates to systems and methods for clearing a top drive from an operational area of a mast on a drilling rig. More particularly, the present disclosure relates to systems and methods for clearing a top drive from an operational area of the mast using a guide rail with interchangeable rail sections.

BACKGROUND OF THE INVENTION

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

On a drilling rig, a top drive may operate in place of rotary table or Kelly drive to apply torque to a drill string while holding the drill string during drilling operations. For example, during a drilling operation, a top drive elevator may hold a top of the drill string, and a top drive motor may be used to rotate the drill string and drill bit to drill further into the well. The top drive may additionally couple to a traveling block and may thus operate to raise and lower the drill string as needed.

In some cases, top drives and top drive elevators may also be used during other operations, such as pipe tripping operations and/or stand building operations to raise and/or lower the drill string or lengths or stands of pipe. As a particular example, during a trip out operation where stands of pipe are removed from the drill string, a top drive elevator may raise the drill string to expose a pipe stand above the drill floor, such that an iron roughneck may be used to decouple the pipe stand from the drill string. The top drive elevator may hold the weight of the pipe stand until it is positioned in a racking board.

However, there are some pipe handling operations and/or other drilling rig operations that may be performable without the use of a top drive. For example, in some embodiments, pipe tripping operations may be performed using an auxiliary lifting line and pipe handling dolly, a robotic lifting aim, and/or other lifting devices. It may thus be desirable to move or clear the top drive from an operational area of the mast or derrick, such that other operations may be performed without interference from the top drive.

BRIEF SUMMARY OF THE INVENTION

The following presents a simplified summary of one or more embodiments of the present disclosure in order to provide a basic understanding of such embodiments. This summary is not an extensive overview of all contemplated embodiments and is intended to neither identify key or critical elements of all embodiments, nor delineate the scope of any or all embodiments.

The present disclosure, in one or more embodiments, relates to a system for clearing a top drive from an operational area of a mast. The system may include a top drive arranged on a top drive dolly. The system may further include a rail arranged within the operational area of the mast and configured for sliding engagement with the top drive dolly. The rail may include a first interchangeable rail section pivotable between an operating configuration and a parked configuration and a second interchangeable rail section pivotable between an operating configuration and a parked configuration. In some embodiments, at least one of the interchangeable rail sections may be configured for positioning the top drive in a parked configuration. The first and second interchangeable rail sections may be configured such that for each rail section, in a parked configuration, the rail section may be arranged outside of the operational area of the mast. For each rail section, the parked and operating configurations may be separated by an angle of between approximately 90 degrees and approximately 270 degrees. The rail may further include a fixed portion, and the first and second interchangeable rail sections may be configured such that for each rail section, in an operating configuration, the rail section may be aligned with the fixed portion of the rail. Each interchangeable rail section may further be configured to engage with the fixed portion of the rail. The fixed portion may include an upper fixed portion and a lower fixed portion, and the interchangeable rail sections may be configured to each be arranged between the upper and lower fixed portions. In some embodiments, the system may further include a pair of pivotable gates each configured to pivot between a closed configuration and an open configuration. The first interchangeable rail section may be arranged on a first pivotable gate and the second interchangeable rail section may be arranged on a second pivotable gate. For each gate, the open and closed configurations may be separated by an angle of between approximately 45 degrees and approximately 135 degrees.

The present disclosure, in one or more embodiments, additionally relates to a method of clearing a top drive from an operational area of a mast. The method may include positioning the top drive on a first of two interchangeable rail sections of a rail, the first rail section arranged in an operating configuration and engaged with a fixed portion of the rail. The method may further include disengaging the first rail section from the fixed portion of the rail. The method may include arranging the first rail section in a parked configuration and arranging the second rail section in an operating configuration. The method may further include engaging the second rail section with the fixed portion of the rail. In some embodiments, arranging the first rail section in a parked configuration may include pivoting the first rail section about a first axis and arranging the second rail section in an operating configuration may include pivoting the second rail section about a second axis. Each rail section may be arranged on a pivotable gate in some embodiments, and the method may include pivoting a first gate from a closed configuration to an open configuration, the first gate having the first rail section arranged thereon. The method may also include pivoting a second gate from a closed configuration to an open configuration, the second gate having the second rail arranged thereon. The method may include pivoting the first and second gates from an open configuration to a closed configuration. The method may further include disconnecting the top drive from a traveling block in some embodiments. Moreover, disengaging the first rail section from the fixed portion of the rail may include actuating the fixed portion to create a gap between the first interchangeable rail section and the fixed portion. The fixed portion of the rail may include an upper fixed portion and a lower fixed portion.

The present disclosure, in one or more embodiments, additionally relates to a drilling rig having a mast defining an operational area and a drill floor supporting the mast. The drilling rig may further have a rail arranged within the operational area of the mast. The rail may have a first interchangeable rail section pivotable between an operating configuration and a parked configuration and a second interchangeable rail section also pivotable between an operating configuration and a parked configuration. The drilling rig may additionally have a drilling cable reeved through a crown block arranged on the mast and a traveling block, the traveling block configured to slidingly engage with the rail. The first and second interchangeable rail sections may be configured such that for each rail section, in the parked configuration, the rail section may be arranged outside of the operational area of the mast. The rail may include a fixed portion, and each interchangeable rail section may be configured to align with the fixed portion of the rail when in an operating configuration. In some embodiments, the mast may include a pair of pivotable gates, each configured to pivot between a closed configuration and an open configuration. The first interchangeable rail section may be arranged on a first pivotable gate and the second interchangeable rail section may be arranged on a second pivotable gate.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

DETAILED DESCRIPTION

The present disclosure, in one or more embodiments, relates to a drilling rig having a mast with a guide rail arranged thereon. The guide rail may be configured for guiding movement of a traveling block, top drive, and/or other equipment. The present disclosure, in one or more embodiments, relates to systems and methods for clearing a top drive from an operational area of the mast such that operations may be performed along the rail without interference from the top drive. Systems and methods of the present disclosure provide for arranging the top drive in a parked configuration outside of, or generally behind, the mast. In the parked configuration, the top drive may avoid interference with other operations occurring within the mast, and may additionally be more readily accessible for maintenance operations performed on the top drive. A guide rail of the present disclosure may have a pair of interchangeable rail sections, each of which may be configured for arrangement in either an operating configuration, where the rail section may be positioned within the operational area of the mast to form part of the rail, or a parked configuration, where the rail section may be positioned outside of the operational area. Each interchangeable rail section may be pivotable about an axis and may be arranged on a pivotable gate of the mast. Together, the pivotable gates and pivotable rail sections may be used to change out the rail sections with one another. To arrange the top drive in a parked configuration, the top drive may be positioned on a first rail section while the first rail section is in an operating configuration, and may remain on the first rail section while it is transitioned to a parked configuration and a second rail section is moved to an operating configuration.

Figure 1:
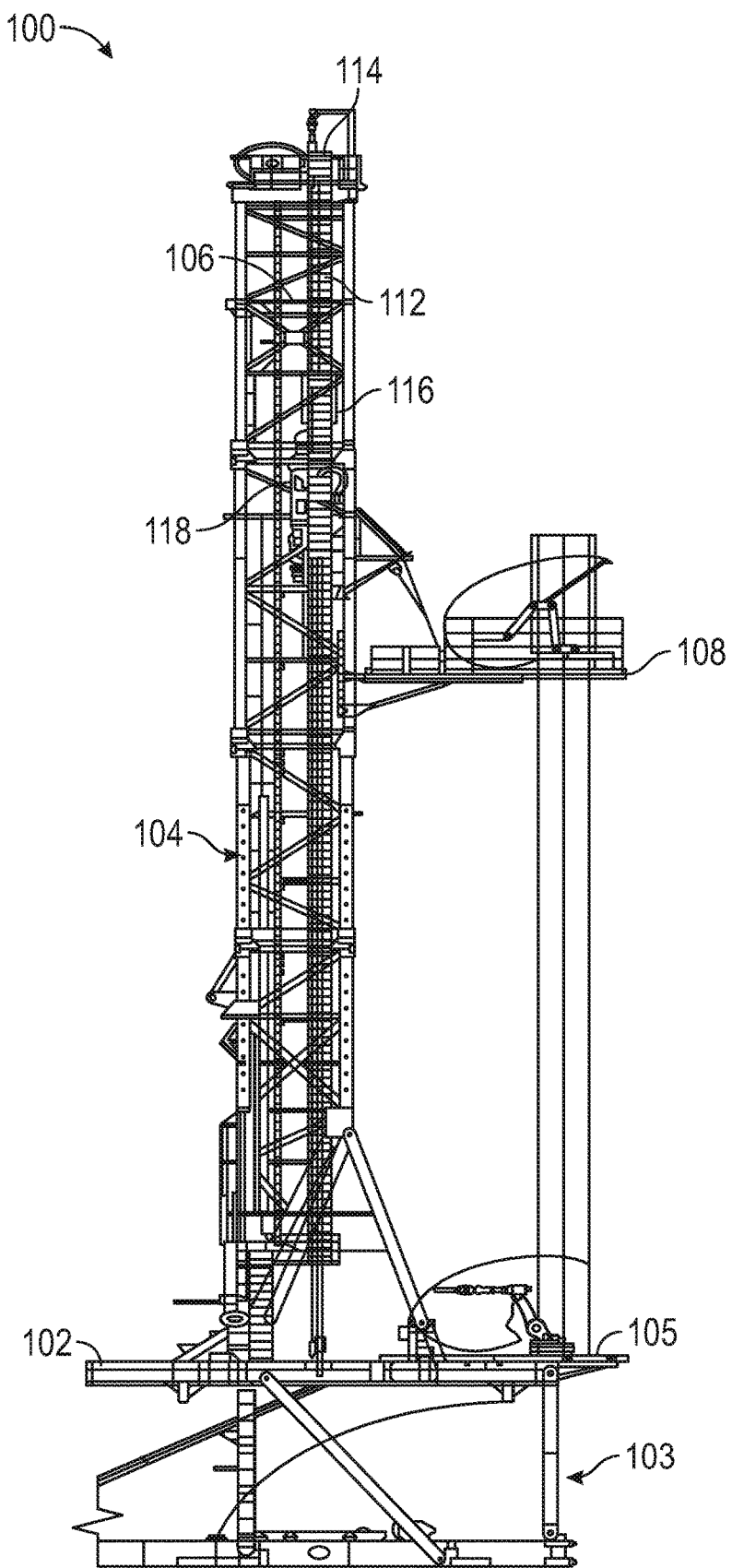
FIG. 1 is a side view of a drill rig having a drill pipe handling system of the present disclosure, according to one or more embodiments.

Turning now to FIG. 1, a drilling rig 100 of the present disclosure is shown. The drilling rig 100 may be configured for onshore oil drilling in some embodiments. However, in other embodiments, other drilling rigs of the present disclosure may be configured for other drilling operations, including offshore drilling. The drilling rig 100 may be configured to be a mobile or stationary rig. The drilling rig 100 may generally have a drill floor 102, a mast 104, a pipe handling system.

The drill floor 102 may include a platform positioned above or over a well and supported by a substructure 103. The drill floor 102 may be configured to provide a working space for drilling operations and/or a storage space for equipment and drill pipe. The drill floor 102 may have an opening arranged at or near well center for accessing the well during drilling operations. The drill floor 102 may additionally include a setback area 105 configured for receiving and/or storing lengths of drill pipe. For example, lengths of drill pipe may be stored as single stands, or may be combined into double stands, triple stands, quadruple stands, or other sized stands 110, and positioned on end in the setback area 105.

The mast 104 may extend from the drill floor with a height suitable for accommodating and/or building single, double, triple, quadruple, or other sized drill pipe stands. For example, the mast 104 may have a height of up to 50 feet, 100 feet 150 feet, 200 feet, or more. In other embodiments, the mast 104 may have any other suitable height or height range. The mast 104 may have four sides in some embodiments, the four sides extending between four corners and defined by a plurality of beams or trusses. The sides of the mast 104 may define an operational area 106 within the mast and above the drill floor 102. The operational area 106 of the mast 104 may be arranged over a well center of a well and may provide a workspace for drilling operations, pipe handling operations, and/or other operations operating within the mast.

In some embodiments, a racking board 108 may extend from the mast 104. The racking board 108 may be configured for maintaining or storing stands of pipe in a generally organized manner. In some embodiments, pipe stands may be stored with a first or lower end arranged on the drill floor 102 in the setback area 105, and a second end or upper end extending in or through a racking board 108. The racking board 108 may extend laterally from the mast 104 at height of between approximately 30 feet and approximately 200 feet from a ground or pad surface, or between approximately 40 feet and approximately 150 feet, or between approximately 50 feet and approximately 100 feet. In other embodiments, the racking 108 board may extend from the mast 104 at any other suitable height.

Figure 2:
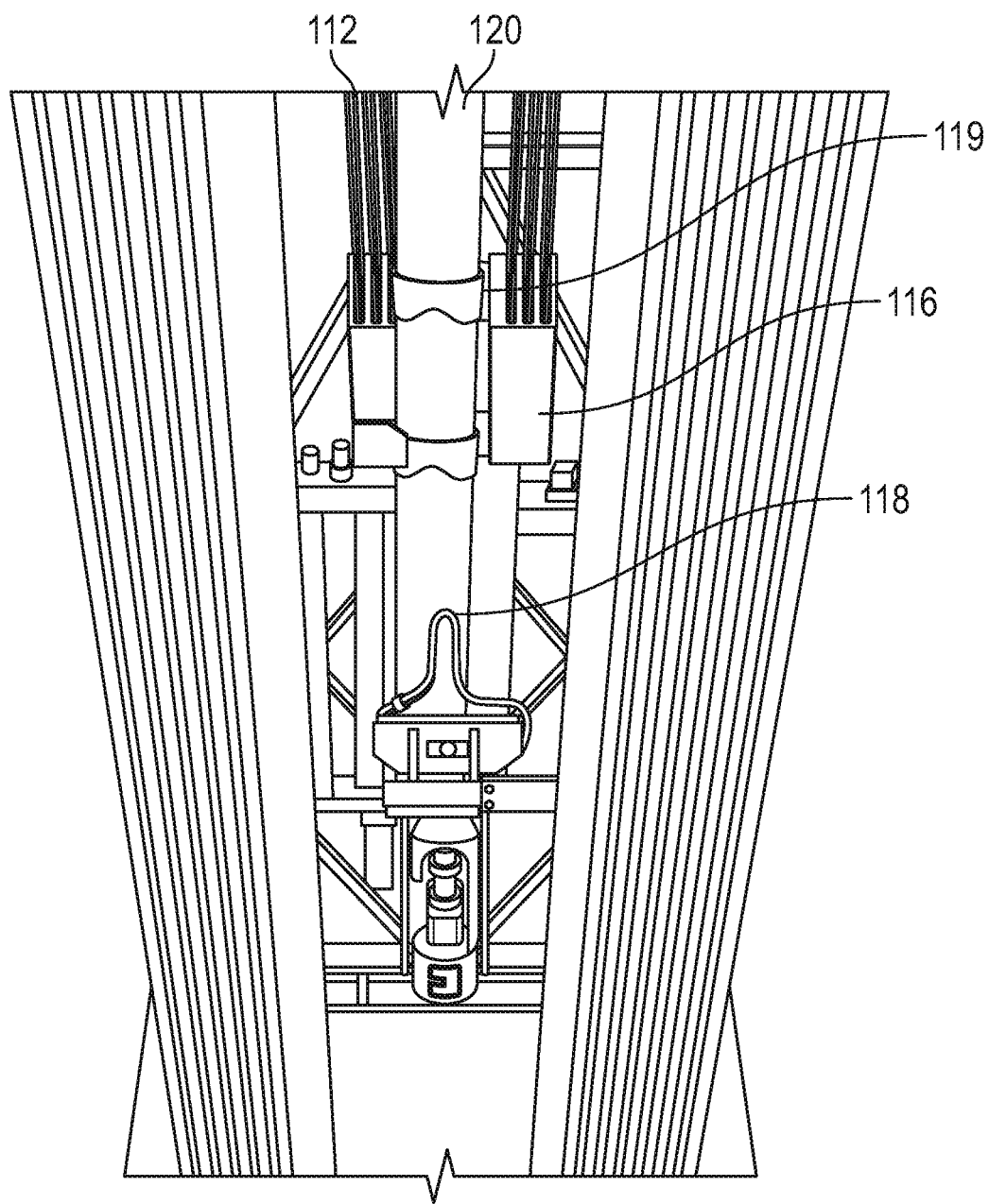
FIG. 2 is a front view of a top drive and traveling block slidingly engaged with a rail of the present disclosure, according to one or more embodiments.

The pipe handling system may be configured for positioning, maneuvering, or lifting a drill string, as well as individual lengths and stands of pipe, above the drill floor. For example, the pipe handling system may be configured for retrieving stands of drill pipe from the racking board and adding the drill pipe stands to the drill string during a trip in operation. The pipe handling system may further be configured for removing stands of drill pipe from the drill string and positioning the stands in the racking board during a trip out operation. The pipe handling system may further be configured for holding, lifting, manipulating, or supporting the drill string during a drilling operation. The pipe handling system may include a main drilling line or cable 112 extending from, and controllable via, a draw works. The drilling cable 112 may be reeved between a crown block 114 and a traveling block 116. The crown block 114 may have a plurality of sheaves and may be arranged at or near a top of the mast 104. The traveling block 116 may have a plurality of sheaves and may be arranged generally beneath the crown block 114 and within the mast 104. The traveling block 116 may be configured to raise and lower as the drilling cable 112 is taken up and released by the draw works. FIG. 2 shows a close-up view of the traveling block 116 arranged within the mast 104, and the drilling cable 112 extending therefrom.

The pipe handling system may additionally include a top drive 118 configured for coupling to the traveling block 116. The top drive 118 may be a mechanized system configured for applying torque or rotational power to a drill string or stand of drill pipe. The top drive 118 may additionally be configured for lifting sections of drill pipe or pipe stands to connect or disconnect the sections or stands from the drill string. The top drive 118 may generally include a drive or drilling motor and transmission for providing rotational power to a drill pipe being handled by the handling system. The top drive 118 may additionally have a pipe handling portion, which may include a pipe elevator arranged on a pair of links or bails, for example. In some embodiments, the top drive 118 may additionally have a mud handling system for delivering drilling fluid to a drill string during drilling operations. In other embodiments, the top drive 118 may have additional or alternative components as well. The top drive 118 may be or be similar to top drives, or include components, described in U.S. Provisional Application No. 62/809,093, entitled Dual Activity Top Drive and filed Feb. 22, 2019, the content of which is hereby incorporated by reference herein in its entirety.

In some embodiments, pipe handling system may additionally include a guide rail 120 for guiding movement of other pipe handling system components. The guide rail 120 may be or include one or more rails arranged generally vertically between the crown block 114 and the drill floor 102. The rail 120 may be configured to slidingly engage with the traveling block 116 and/or top drive 118 to mitigate lateral movement of the traveling block and/or top drive. The guide rail 120 may be arranged on, or extend from, an inner wall or side of the mast 104. The guide rail 120 may have one or more grooves or tracks configured for engaging with wheels, slidable brackets, or any other suitable sliding mechanism. In some embodiments, the guide rail 120 may have a length configured to guide movement of the traveling block 116 and/or top drive 118 throughout a full range of vertical movement within the mast 104. The guide rail 120 may have a length approximately equal or similar to the height of the mast 104. In some embodiments, the guide rail 120 may have a length of between approximately 50 feet and approximately 300 feet, or between approximately 75 feet and approximately 200 feet, or between approximately 100 feet and approximately 150 feet. In some embodiments, the guide rail 120 may have a length of between approximately 120 feet and approximately 140 feet. However, in other embodiments, the guide rail 120 may have any other suitable length, and the length may depend at least in part on a height of the mast 104. The guide rail 120 may have a width of between approximately 4 inches and approximately 36 inches, or between approximately 8 inches and approximately 30 inches, or between approximately 12 inches and approximately 24 inches. In at least one embodiment, the guide rail 120 may have a length of approximately 18 inches or approximately 19 inches. In still other embodiments, the guide rail 120 may have any other suitable width. The width of the guide rail 120 may depend, at least in part, on the particular type or size of top drive 118 employed.

For engagement with the guide rail 120, the traveling block 116 may have, or be coupled to, a guide dolly 119 configured for sliding engagement with the guide rail 120, as shown in FIG. 2. For example, the traveling block guide dolly 119 may have a bracket and/or rollers configured to engage with and slide along the guide rail 120. The traveling block guide dolly 119 may operate to control or limit lateral movement of the traveling block 116 as the traveling block moves between the drill floor 102 and the crown block 114 via the drilling cable 112. The top drive 118 may additionally have a guide dolly 121, as may be seen in FIGS. 3 and 4. The top drive guide dolly 121 may have a bracket and/or rollers configured to engage with and slide along the guide rail 120. The top drive guide dolly 121 may operate to control or limit lateral movement of the top drive 118 as the top drive moves between the drill floor 102 and crown block 114 via the drilling cable 112.

Figure 3:
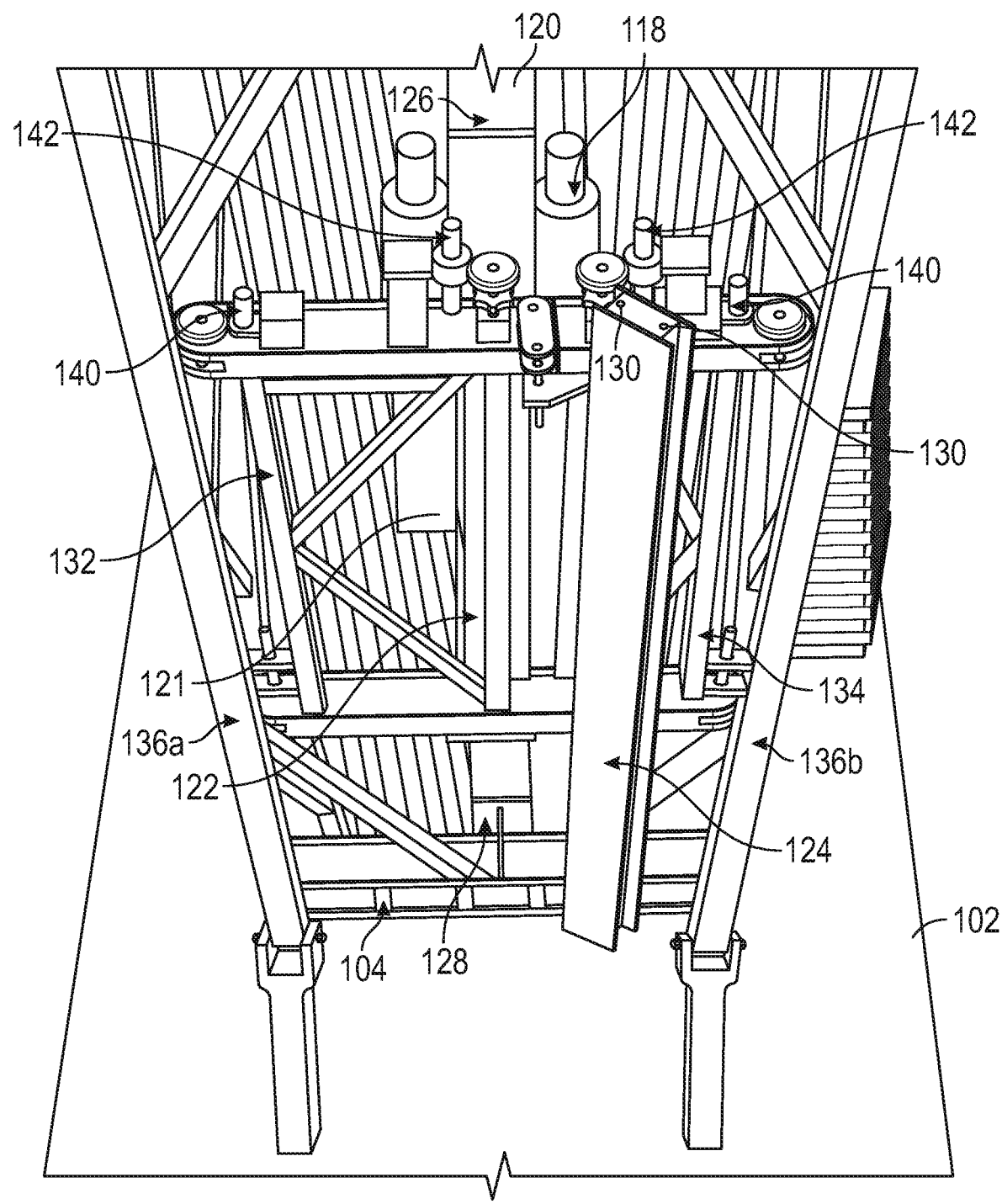
FIG. 3 is a rear view of a mast having a pair of interchangeable rail sections arranged on a pair of gates, wherein the gates are arranged in a closed configuration, a first rail section is arranged in an operating configuration, and a second rail section is arranged in a parked configuration, according to one or more embodiments.

In some embodiments, a portion of the guide rail 120 may be configured to be interchangeable. In particular and with reference to FIG. 3, the guide rail 120 may have a pair of interchangeable rail sections 122, 124, configured to interchangeably couple to a remaining portion of the rail to form a continuous rail. Either of the interchangeable rail sections 122, 124 may be positioned within the rail to complete a continuous rail. FIG. 3 illustrates a first section 122 of the two interchangeable rail sections arranged along the rail 120. In some embodiments, the rail 120 may be configured to receive an interchangeable rail section 122, 124 between two generally fixed portions of the rail. For example, each of the two interchangeable sections 122, 124 may be configured to be received between a first fixed rail portion, such as an upper fixed portion 126, and a second fixed rail portion, such as a lower fixed portion 128. The interchangeable portion of the rail 120, which may be completed by either of the two interchangeable rail sections 122, 124, may be arranged at any suitable location along the length of the rail. In some embodiments, the interchangeable portion may be arranged generally near a bottom of the rail 120, or near the drill floor 102. The interchangeable portion of the rail 120, and thus each interchangeable rail section 122, 124, may have a length of between approximately 24 inches and approximately 100 inches, or between approximately 36 inches and approximately 75 inches, or between approximately 45 inches and approximately 55 inches. In at least one embodiment, the rail sections 122, 124 may each have a length of approximately 48 inches or approximately 50 inches. In still other embodiments, the rail sections 122, 124 may have other suitable lengths. In some embodiments, the lengths of the rail sections 122, 124 may depend, at least in part, on a height of the mast 104, length of the guide rail 120, and/or type and size of top drive 118.

Each interchangeable section 122, 124 may be configured to engage with the a remaining portion of the rail 120 so as form a continuous rail. In some embodiments, each interchangeable section 122, 124 may be configured to engage with the upper 126 and lower 128 fixed portions of the rail with pins, bolts, camps, and/or any other suitable coupling mechanism(s). As shown for example in FIG. 4, in some embodiments, each rail section 122, 124 may have a pair of pins 130 arranged at a first end of the section and configured to engage with a pair of corresponding openings of the upper fixed portion 126 of the rail. Each section 122, 124 may additionally have a pair of openings arranged at an opposing end of the section and configured to engage with a pair of pins extending from the lower fixed portion 128 of the rail. In other embodiments, the interchangeable sections 122, 124 may have any other suitable number and arrangement of pins and/or any other suitable coupling mechanisms for coupling to the fixed portions 126, 128 of the rail 120.

Figure 5:
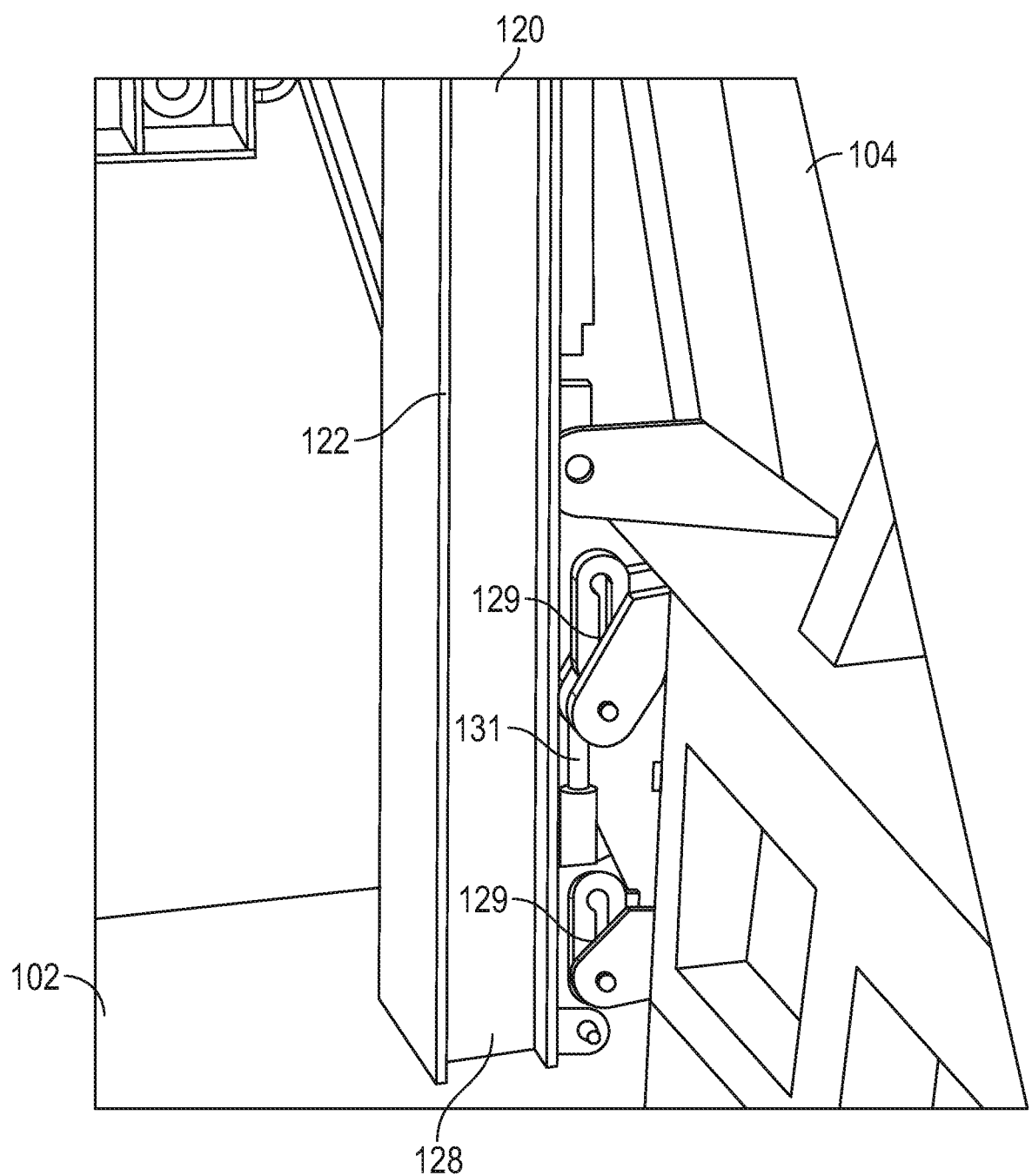
FIG. 5 is a perspective view of an interchangeable rail section engaged with a lower fixed rail portion of a rail of the present disclosure, according to one or more embodiments.
Figure 6:
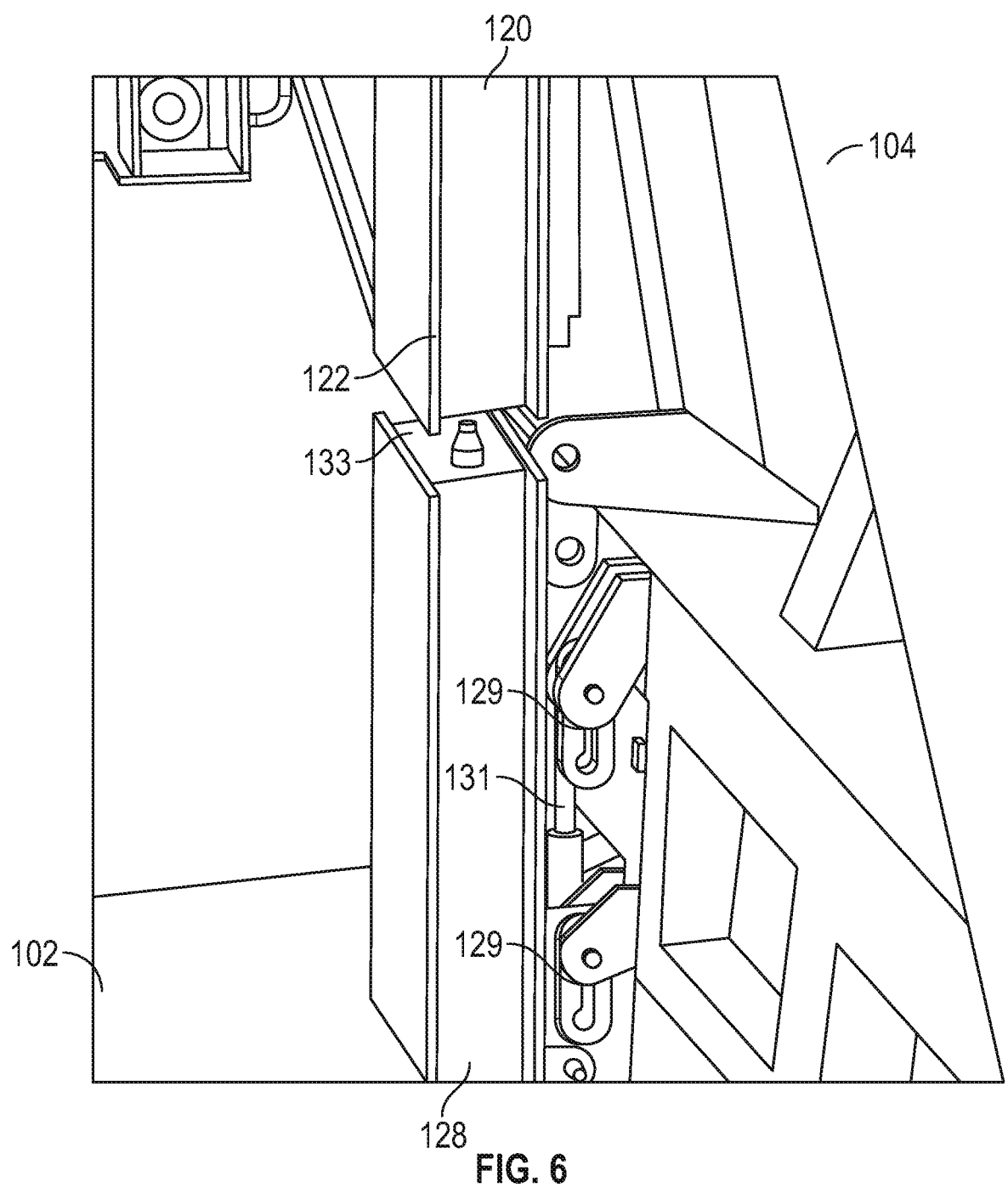
FIG. 6 is a perspective view of an interchangeable rail section disengaged from a lower fixed rail portion of a rail of the present disclosure, according to one or more embodiments.

To disengage an interchangeable rail section 122, 124 from the rail 120, a fixed portion of the rail may be configured to slide axially away from the interchangeable rail section, thereby creating a gap in the rail. For example and as shown in FIG. 5, the lower fixed portion 128 may be coupled to the mast 104 with one or more pin-and-slot mechanisms 129. In particular, the lower fixed portion 128 may have one or more tabs or flanges extending therefrom, each having an elongated slot configured to receive a pin extending from the mast 104. The elongated slot(s) may allow the lower fixed portion 128 to slide axially a fixed distance. To disengage an interchangeable rail section from the rail 120, the lower fixed portion 128 may slide toward the drill floor 102 or away from the interchangeable rail section. In some embodiments, a hydraulic cylinder 131 may actuate sliding movement of the lower fixed portion 128. In other embodiments, other actuating mechanisms may be used. FIG. 6 shows the lower fixed portion 128 and interchangeable rail section 122 disengaged from one another. As shown in FIG. 6, actuation of the lower fixed portion 128 away from the interchangeable rail section 122 may create a gap 133 between the lower fixed portion and the interchangeable rail section.

In some embodiments, actuation of the lower fixed portion 128 away from the interchangeable section 122 may additionally create a gap between the interchangeable section and the upper fixed portion 126. For example, each interchangeable rail section 122, 124 may be arranged on one or more pin-and-slot mechanisms 129. Thus, as the lower fixed portion 128 slides downward, the interchangeable section 122 aligned with the rail 120 may also slide downward, so as to create a gap both above and below the interchangeable section 122. To reengage the interchangeable rail section 122 in the rail 120, the hydraulic cylinder 131 or other actuator may push the lower fixed rail portion 128 toward the interchangeable section 122. The actuation of the hydraulic cylinder 131 may cause the lower fixed rail portion 128 and the interchangeable section 122 to slide along their pin-and-slot mechanisms 129 toward the upper fixed rail portion 126, thus closing gaps 133 surrounding the interchangeable rail section.

Figure 7:
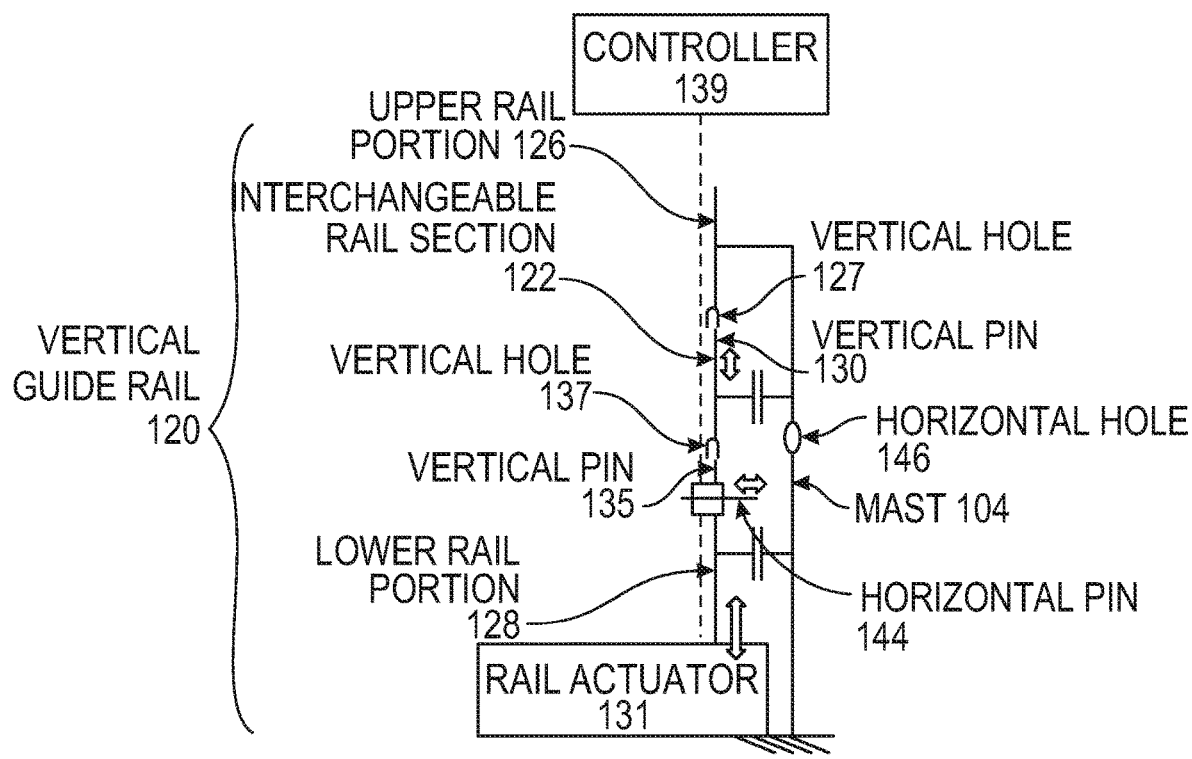
FIG. 7 is a schematic diagram of an interchangeable rail section arranged between upper and lower fixed rail portions of a rail of the present disclosure, according to one or more embodiments.

FIG. 7 schematically illustrates an interchangeable rail section 122 arranged between an upper fixed portion 126 and lower fixed portion 128 of the rail 120, the lower fixed portion actuatable by a hydraulic cylinder or other actuator 131. As shown, the interchangeable section 122 may have one or more pins 130 configured to engage with one or more openings or holes 127 of the upper fixed portion 126. Additionally, the lower fixed portion 128 may have one or more pins 135 configured to engage with one or more openings or holes 137 arranged on the interchangeable rail section 122. The hydraulic cylinder or other actuator 131 may be controllable via a controller 139. Moreover, one or more pins 144, which may be arranged horizontally or which may otherwise be arranged perpendicular to an axis of movement of the lower fixed portion 128, may be configured to extend between the lower fixed portion and the mast 104. The pin 144 may help to hold the lower fixed portion 128 and interchangeable section 122 in an upward position against the upper fixed portion 126. The pin 144 may extend from the lower fixed portion 128 of the rail and may be configured to be received within an opening or hole 146 arranged on the mast 104.

With reference back to FIGS. 3 and 4, in some embodiments, each interchangeable rail section 122, 124 may be arranged on a gate 132, 134, each of which may be pivotably coupled to the mast 104. In particular and as shown in FIG. 3, the mast 104 may have a first truss 136a, which may be a generally vertical truss extending between the drill floor 102 and a top of the mast at or near the crown block 114. A second truss 136b may extend parallel to the first truss 136a between the drill floor 102 and a top of the mast 104. In some embodiments, the two parallel trusses 136a, 136b may each define or be arranged near a corner of the mast 104. A first gate 132 may extend from the first truss 136a, and a second gate 134 may extend from the second truss 136b. The gates 132, 134 may extend from the respective trusses 136a, 136b at a same height or position along the length of the trusses. The gates 132, 134 may be configured to extend from the trusses 136a, 136b toward one another. Each gate 132, 134 may have a width extending approximately half a distance between the two parallel trusses 136a, 136b. Together, the two gates 132, 134 may span a distance between the two trusses 136a, 136b.

Figure 4:
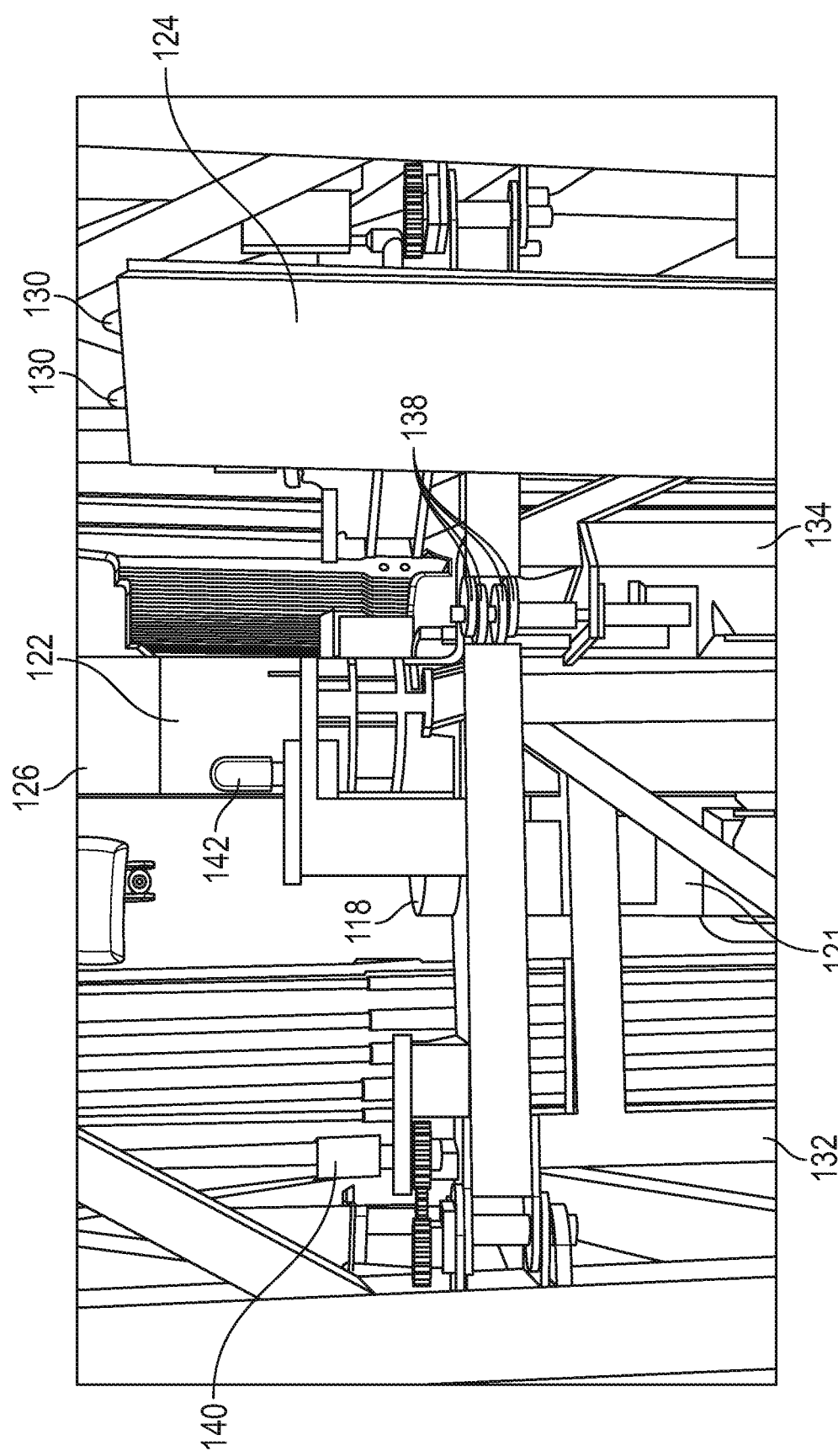
FIG. 4 is a closeup view of a portion of the interchangeable rail sections and gates of FIG. 3, according to one or more embodiments.

The gates 132, 134 may be pivotably coupled to the mast 104. In particular, each gate 132, 134 may have a hinged connection to its corresponding truss 136a, 136b and may be configured to pivot between a closed configuration or position and an open configuration or position. Each gate 132, 134 may pivot about a generally vertical axis, which may be parallel to the trusses 136a, 136b. In the closed configuration, as shown for example in FIGS. 3 and 10, each gate 132, 134 may extend between the two parallel trusses 136a, 136b. Further, in the closed configuration, the gates 132, 134 may be configured to arrange an interchangeable rail section 122 along the rail 120 so as to be in line with the upper 126 and lower 128 fixed portions of the rail. In some embodiments, the gates 132, 134 may be configured to engage with one another in a closed configuration. As shown in FIG. 4, each gate 132, 134 may have one or more tabs or flanges 138 configured to align and/or overlap with corresponding tabs or flanges from an opposing gate. The tabs or flanges 138 may have one or more openings configured to receive a pin or bolt. In the closed configuration, the tabs or flanges 138 of the two gates 132, 134 may overlap with one another and may align such that a pin or bolt may be arranged through the tabs or flanges to couple the gates together.

Figure 8:
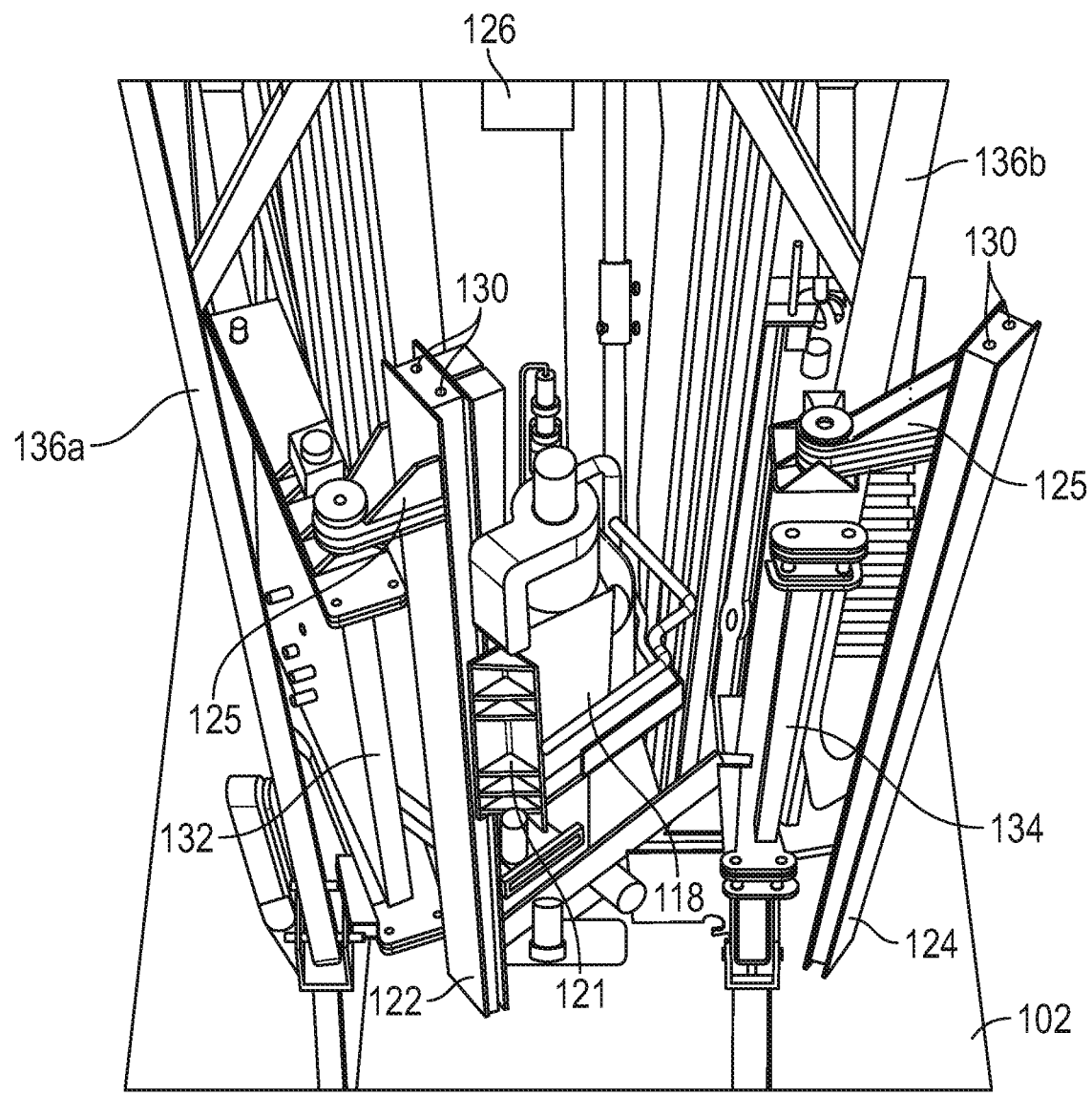
FIG. 8 is a rear view of a mast having a pair of interchangeable rail sections arranged on a pair of gates, wherein the gates are arranged in an open configuration, a first rail section is arranged in an operating configuration, and a second rail section is arranged in a parked configuration, according to one or more embodiments.
Figure 9:
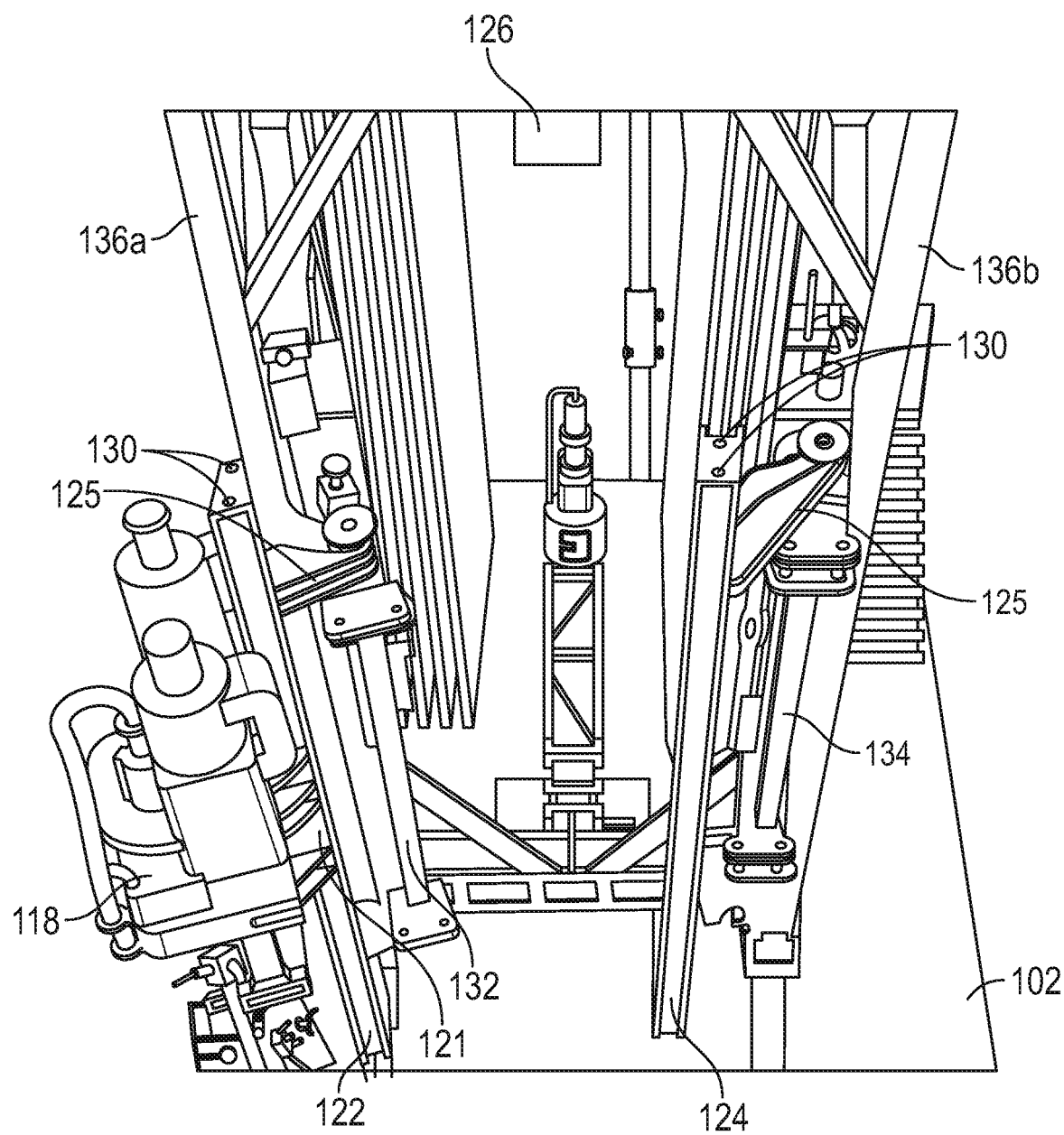
FIG. 9 is a rear view of a mast having a pair of interchangeable rail sections arranged on a pair of gates, wherein the gates are arranged in an open configuration, a first rail section is arranged in a parked configuration, and a second rail section is arranged in an operating configuration, according to one or more embodiments.

FIGS. 8 and 9 show the gates 132, 134 in an open configuration. In an open configuration, the gates 132, 134 may be pivoted away from one another. To transition between a closed configuration and an open configuration, each gate 132, 134 may pivot between approximately 60 degrees and approximately 120 degrees, or between approximately 75 degrees and approximately 105 degrees, or between approximately 80 degrees and approximately 100 degrees. In some embodiments, each gate 132, 134 may pivot approximately 90 degrees between its closed configuration and open configuration. In some embodiments, each gate 132, 134 may have a motor 140, such as a hydraulic motor, configured to actuate one or more rotatable gears to pivot the gate between an open configuration and a closed configuration. The motors 140 may be controllable via a controller.

As indicated above, each interchangeable rail section 122, 124 may be arranged on a gate 132, 134, respectively. As may be appreciated with reference to FIGS. 8 and 9, each interchangeable rail section 122, 124 may couple to a corresponding gate 132, 134 via one or more brackets 125. Each interchangeable section 122, 124 may be pivotably coupled to a gate 132, 134 in some embodiments. In particular, each interchangeable rail section 122, 124 may be configured to pivot at its connection to the corresponding gate 132, 134 about a generally vertical axis, which may be parallel to the rail 120. The rail sections 122, 124 may be configured to each pivot between an operating configuration or position and a parked configuration or position.

An operating configuration may arrange a rail section 122, 124 on a first side of its corresponding gate 132, 134 so as to direct the rail section toward an operational area 106 of the mast 104. In an operating configuration, when the corresponding gate 132, 134 is closed, a rail section 122, 124 may be configured to align with and engage with an upper 126 and lower 128 fixed rail portion to form a complete rail 120. Interchangeable rail section 122 is shown in an operating configuration in FIG. 3 and in FIG. 8, for example. In a parked configuration, a rail section 122, 124 may be arranged on an opposing side of its corresponding gate 132, 134. The parked configuration may be configured for storing a rail section 122, 124 when the rail section is not engaged with upper 126 and lower 128 fixed rail portions. In a parked configuration, when the corresponding gate 132, 134 is closed, a rail section 122, 124 may be arranged outside of the operational area 106 and generally behind or beside a sidewall of the mast 104. FIGS. 3 and 8 show the interchangeable rail section 124 in a parked configuration.

Figure 10:
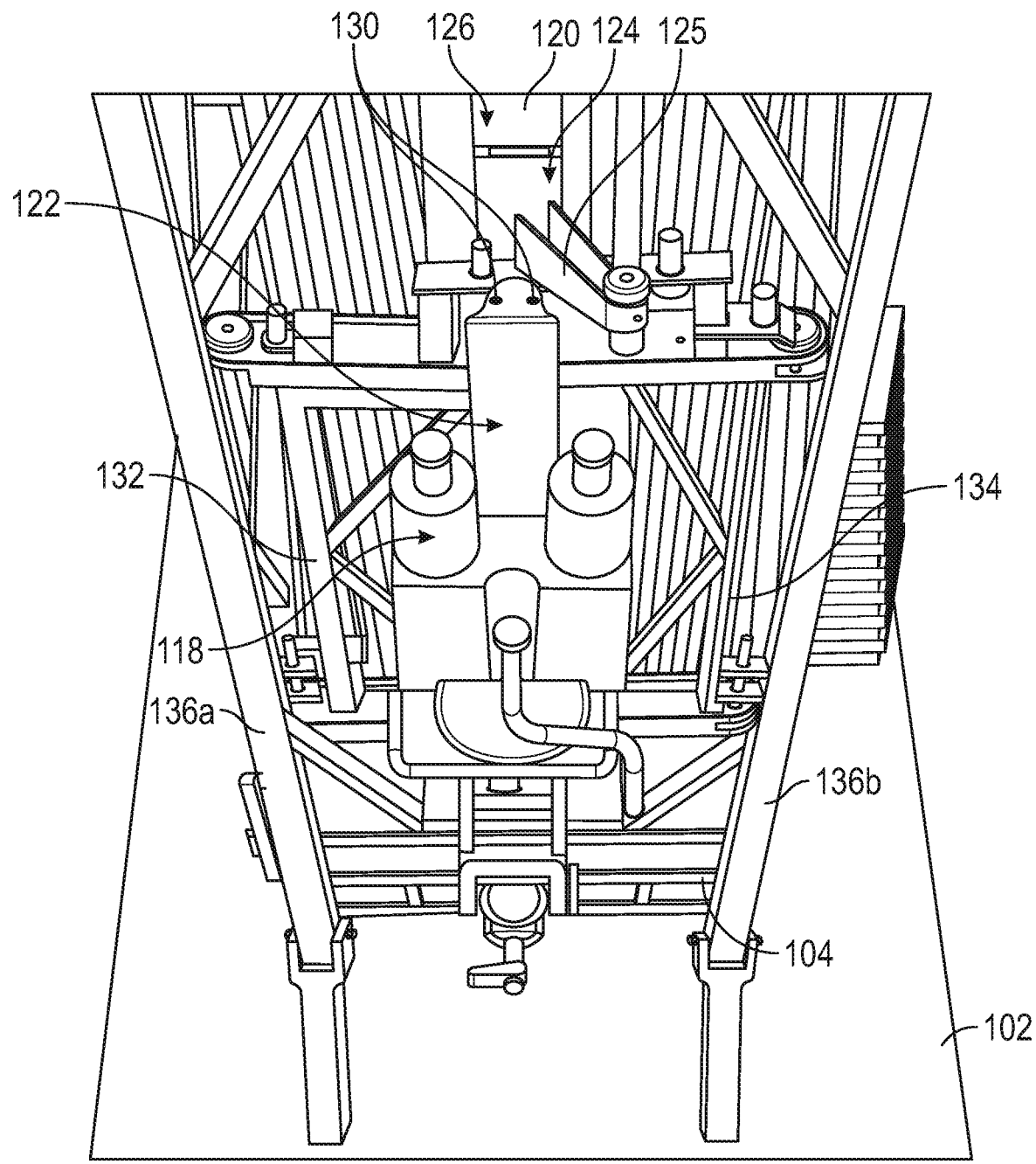
FIG. 10 is a rear view of a mast having a pair of interchangeable rail sections arranged on a pair of gates, wherein the gates are arranged in a closed configuration, a first rail section is arranged in a parked configuration, and a second rail section is arranged in an operating configuration, according to one or more embodiments.
Figure 11:
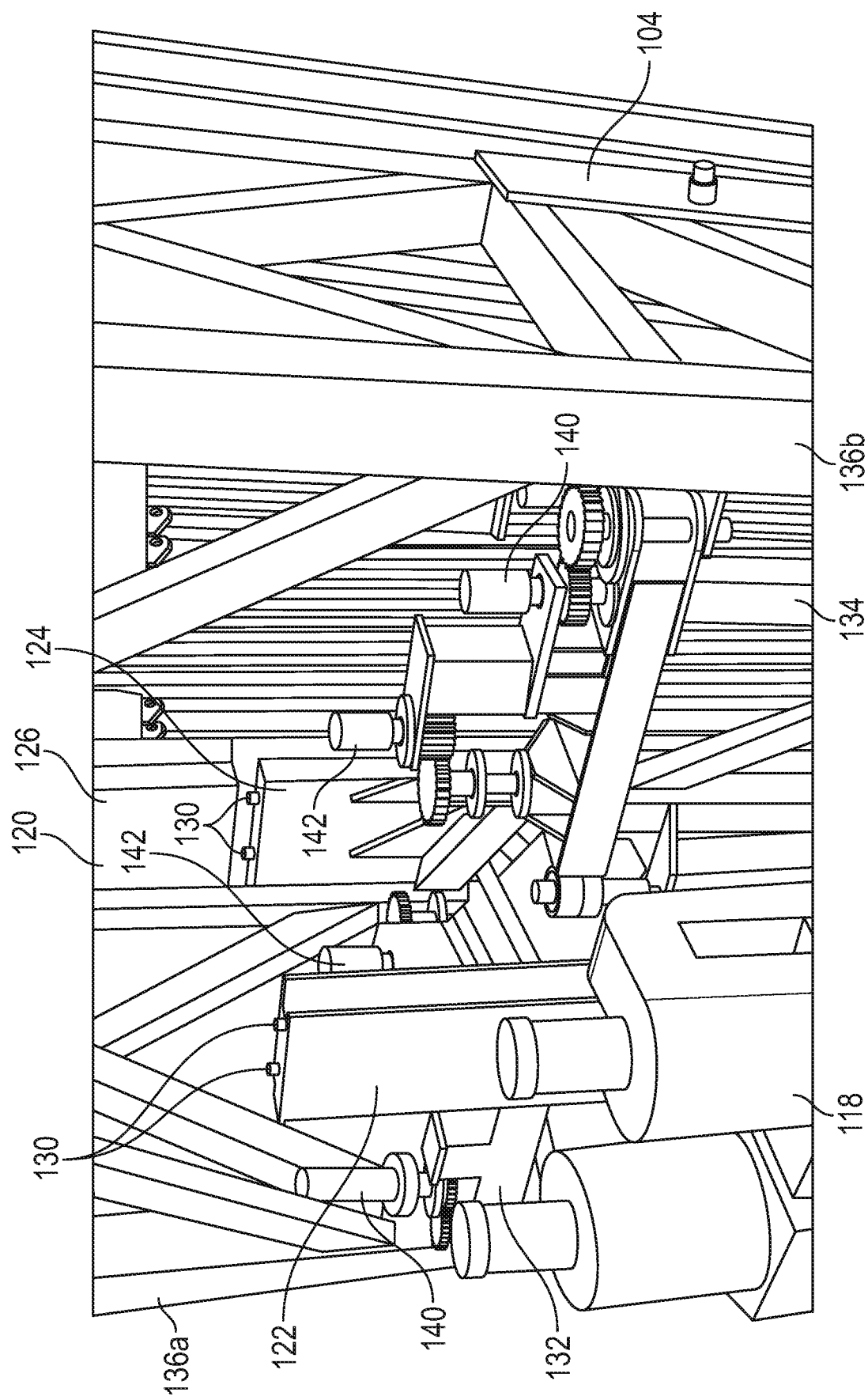
FIG. 11 is a closeup view of a portion of the interchangeable rail sections and gates of FIG. 10, according to one or more embodiments.
Figure 12:
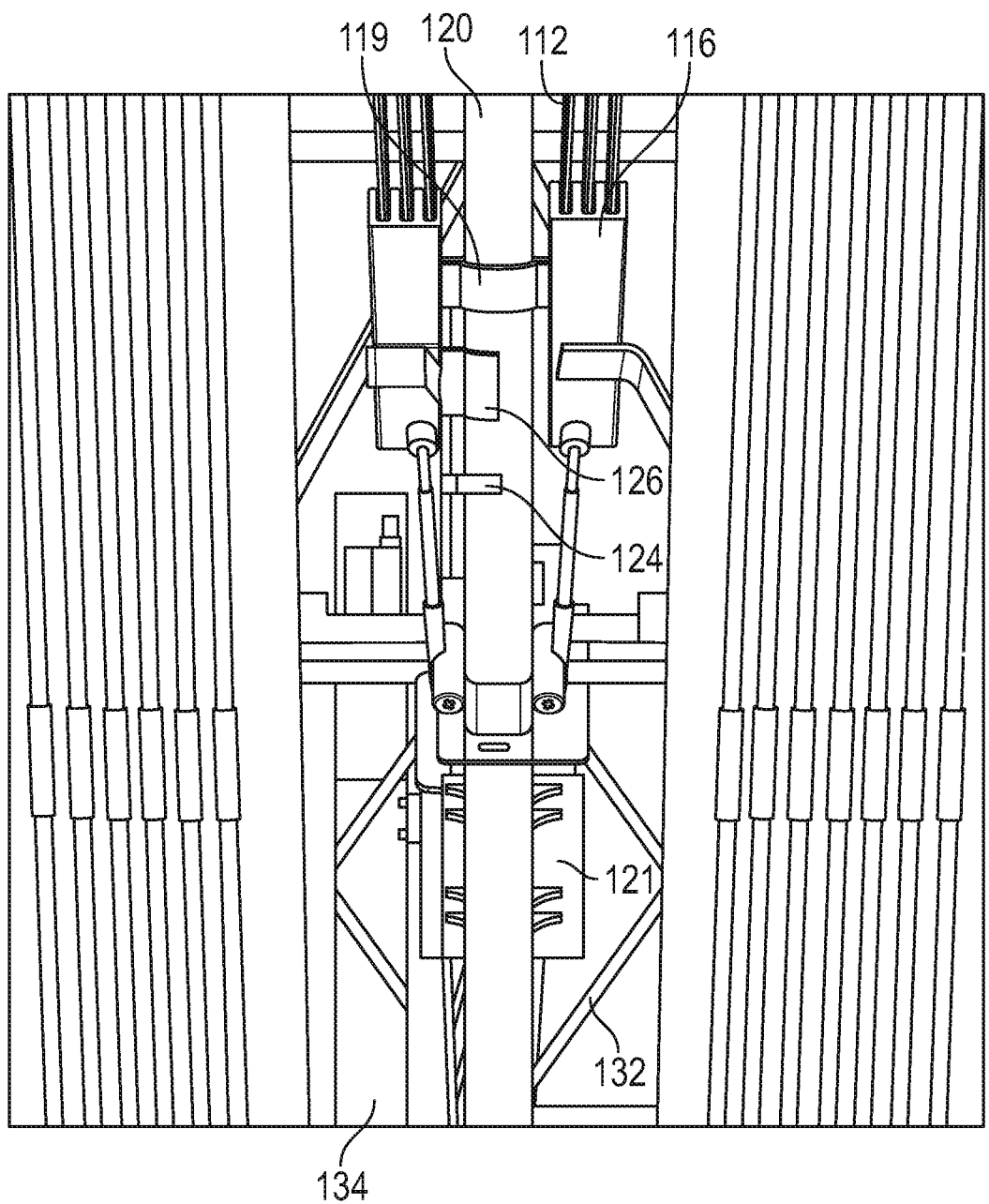
FIG. 12 is a front view of traveling block slidingly engaged with a rail of the present disclosure while a top drive is arranged in a parked configuration, according to one or more embodiments.

FIGS. 9 and 10 show the rail sections 122, 124 in opposing configurations as compared with FIGS. 3 and 8. In FIGS. 9 and 10 the rail section 122 on gate 132 is arranged in a parked configuration, and the rail section 124 on gate 134 is arranged in an operating configuration. To transition between an operating configuration and a parked configuration, each rail section 122, 124 may pivot between approximately 100 degrees and approximately 220 degrees, or between approximately 120 degrees and approximately 200 degrees, or between approximately 140 degrees and approximately 180 degrees. FIG. 12 additionally shows front view of the rail 120 with the rail section 124 in an operating configuration, while the rail section 122 (not shown) is arranged in a parked configuration. In some embodiments, each rail section 122, 124 may have a motor 142, such as a hydraulic motor, configured to actuate one or more rotatable gears to pivot the rail section between an operating configuration and a parked configuration. The motors 142 may be controllable via a controller. FIG. 11 shows a close-up view of the gate motor 140 of gate 134 and the rail motor 142 of interchangeable rail section 124. As shown, the motors 140, 142 for a gate and a rail section may be arranged on the corresponding gate 132, 134 in some embodiments.

Figure 13:
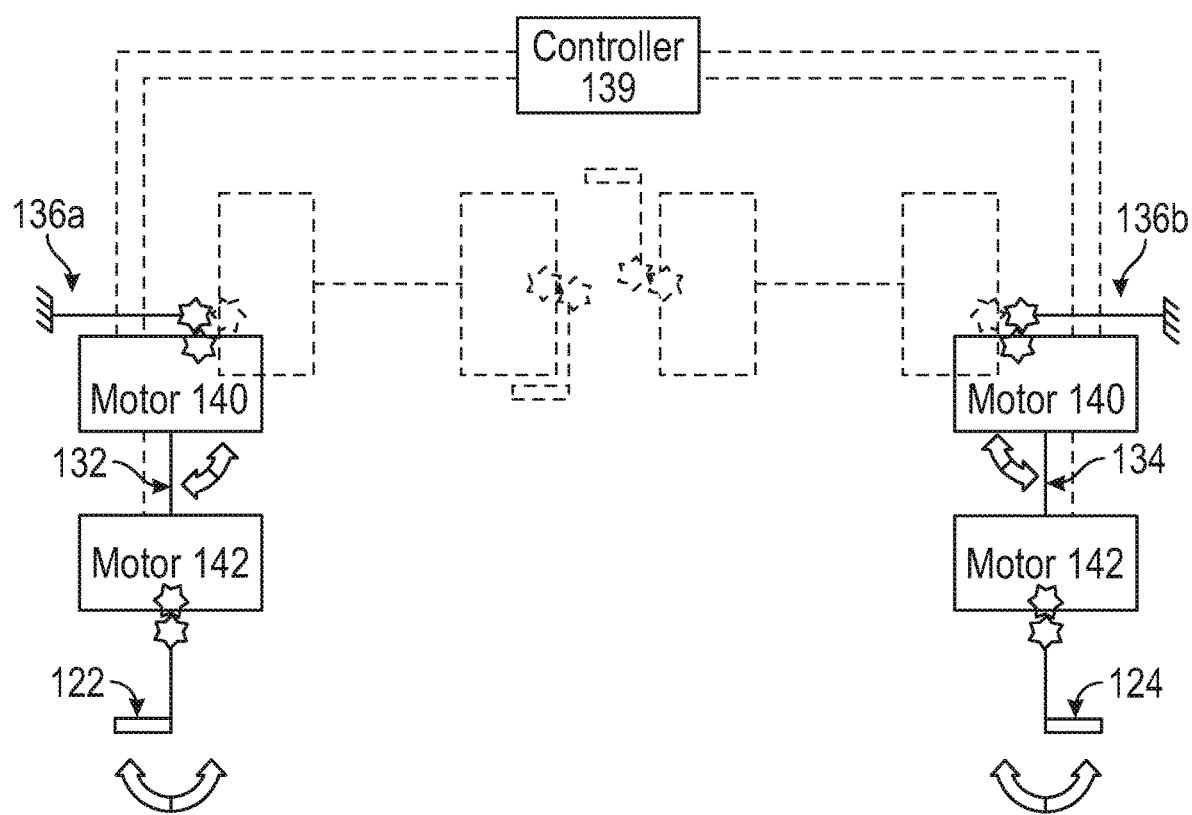
FIG. 13 is a schematic diagram of a pair of pivotable interchangeable rail sections arranged on a pair of pivotable gates, according to one or more embodiments.

Together, the pivotable gates 132, 134 and pivotable rail sections 122, 124 may operate to change out the rail sections with respect to the rail 120. FIG. 13 schematically illustrates closed and open configurations of the gates 132, 134 and operating and parked configurations of the rail sections 122, 124. As shown in FIG. 13, each gate 132, 134 may extend from a truss 136*a*, 136*b* of the mast. Further, each rail section 122, 124 may be arranged on a corresponding one of the gates 132, 134. As described above, each gate 132, 134 may be configured to pivot between a closed configuration (shown in dashed lines) and an open configuration (shown in solid lines). A motor 140 may control pivoting movement of each gate 132, 134. Additionally, each rail section 122, 124 may be configured to pivot between an operating configuration and a parked configuration. In the dashed line configuration, the rail section 122 is shown in a parked configuration and the rail section 124 is shown in an operating configuration. In the solid line configuration, both rail sections 122, 124 are shown in transition between operating and parked configurations. A motor 142 may operate pivoting movement of each rail section 122, 124. Further, one or more controller 139 may control the motors 140, 142 automatically and/or in response to an operator or user command.

In use, interchangeable rail sections of the present disclosure may be operated to clear a top drive from an operational area of the mast. In particular, the interchangeable rail sections 122, 124 described above may be configured for arranging the top drive 118 in a parked configuration when not in use, such that the traveling block 116 may slide along the rail 120 without interference from the top drive. Arranging the top drive 118 in a parked configuration may additionally allow ready access to the top drive for performing maintenance on the top drive.

Figure 14:
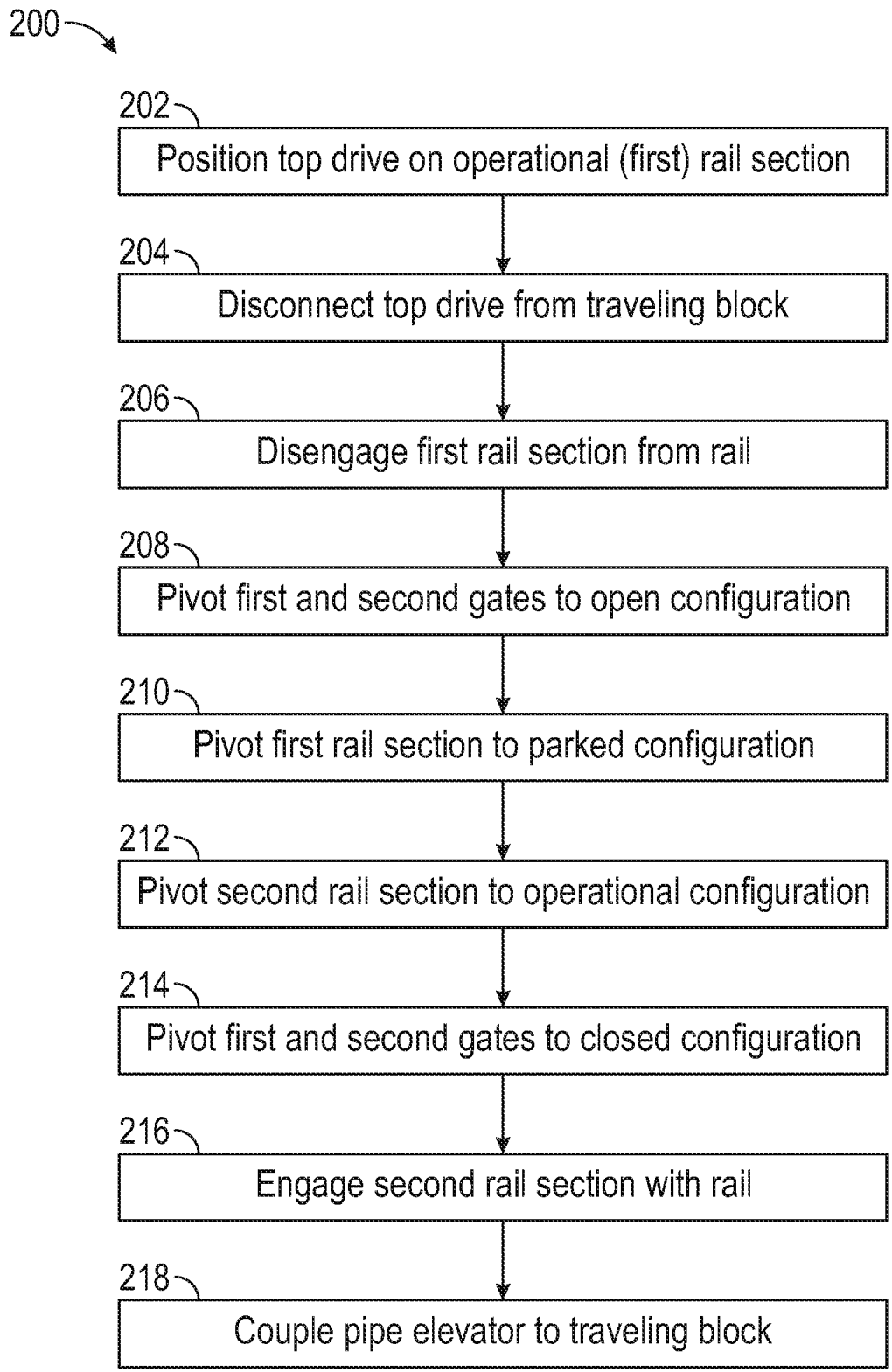
FIG. 14 is a flow diagram of a method of clearing a top drive of the present disclosure, according to one or more embodiments.

Turning now to FIG. 14, a method 200 of clearing a top drive from an operational area is shown according to one or more embodiments. For example, where it is desired to perform operations, such as some tripping or stand building operations, using a mast rail but without the need for a top drive, the method 200 may be performed to clear the top drive the operational area of the mast. Alternatively, where it is desired to perform maintenance on the top drive, the method 200 may be used to move the top drive to a parked configuration where it may be more easily accessed. As described above, where a mast rail has two interchangeable rail sections, a first rail section may be arranged in an operating configuration to form a part of the continuous rail, and a second rail section may be arranged in a parked configuration. The method 200 may include the steps of positioning a top drive on a first interchangeable rail section, which may be in an operating configuration (202); disconnecting the top drive from a travelling block (204); disengaging the first rail section from the rail (206); pivoting the first and second gates to an open configuration (208); pivoting the first rail section to a parked configuration (210); pivoting a second rail section to an operating configuration (212); pivoting the first and second gates to a closed configuration (214); engaging the second rail section with the rail (216); and coupling a pipe elevator to the traveling block (218). In other embodiments, the method 200 may include additional and/or alternative steps.

Positioning a top drive on an operating (first) rail section (202) may include sliding the top drive along the rail until its rail engaging portion is arranged on the first interchangeable section. The top drive may be arranged on the first rail section such that an entire length of the top drive is arranged on or adjacent the first rail section and such that the top drive does not extend over or onto an upper or lower fixed rail portion. Where the top drive is coupled to a traveling block, the top drive may be positioned by operating a draw works on which the main drilling cable is arranged to raise or lower the traveling block. FIGS. 3 and 4 illustrate the top drive 118 arranged on a first rail section 122, according to some embodiments. Additionally, where the top drive is coupled to the traveling block, the top drive may additionally be disconnected from the traveling block (204).

With the top drive arranged on the first interchangeable rail section, the first interchangeable rail section may be disengaged from the rail (206). This may include disengaging the first interchangeable section from a fixed upper rail portion and/or a fixed lower portion. In some embodiments, the first interchangeable section may be disengaged by actuating the lower fixed rail portion to move the lower fixed rail portion away from the first interchangeable section. As described above with respect to FIGS. 5-7, this may create a gap between the first interchangeable section and the upper and/or lower fixed rail portions. Additionally, the first and second gates may be each moved from a closed configuration to an open configuration (208). For example, the gates may each be pivoted about their connections to the mast. In FIG. 8, the gates 132, 134 are shown in an open configuration.

With the gates in an open configuration, or while the gates transition between closed and open configurations, the interchangeable rail sections may also be pivoted about their connections to the gates. In particular, the first rail section, in an operating configuration and having the top drive arranged thereon, may be pivoted about its connection to the gate to reach a parked configuration (210). Additionally, the second rail section, in a parked configuration, may be pivoted about its connection to the gate to reach an operating configuration (212). Pivoting of the rail sections may be appreciated with respect to FIGS. 8 and 9. In FIG. 8, the first rail section 122, having the top drive 118 arranged thereon, is shown in an operating configuration and the second rail section 124 is shown in a parked configuration. In FIG. 9, the first rail section 122 having the top drive 118 is shown in a parked configuration, on an opposing side of the gate 132 as compared with the operating configuration of FIG. 8. Additionally in FIG. 9, the second rail section 124 is shown in an operating configuration, on an opposing side of the gate 134 as compared with its operating configuration of FIG. 8.

With the first rail section in a parked configuration and the second rail section in an operating configuration, the two gates may be moved to a closed configuration (214). In particular each gate may be pivoted about its connection to the mast to reach a closed configuration. It is to be appreciated that with the gates in a closed configuration, the second rail section, now in an operating configuration, may align with the upper and lower fixed portions of the rail. It is further to be appreciated that with the first rail section arranged in a parked configuration, the top drive may be arranged generally behind the mast and out of the operational area of the mast. This may be appreciated with respect to FIG. 10, which shows the gates 132, 134 in a closed configuration with the first rail section 122 in a parked configuration and the second rail section 124 now in an operating configuration. The second rail section may engage with the rail (216). For example, the lower fixed rail portion may be actuated to close a gap between the second interchangeable section and the upper and/or lower fixed portions of the rail. In particular, a hydraulic cylinder may be actuated to push the lower fixed rail portion upward, which may in turn push the second interchangeable section upward, so as to close gaps and form a continuous rail. Pins and/or pin openings of the second rail section may engage with corresponding pin openings and/or pins of the upper and lower rail fixed portions, as may be appreciated with respect to FIG. 11. With the top drive cleared, the traveling block, rail, and/or other equipment within the operational area of the mast may be used for other operations. In some embodiments, the method 200 may additionally include coupling a pipe elevator and/or other equipment to the traveling block (218). This may be appreciated with respect to the front view of FIG. 12.

It is to be appreciated that, to bring the top drive from a parked configuration into an operating configuration, the method 200 may be generally reversed. In particular, to bring a parked top drive into an operating configuration, the second (or empty) interchangeable rail section may be disengaged from upper and lower fixed rail portions, and the lower fixed rail portion may be lowered to introduce a gap between the interchangeable section and the upper and/or lower fixed portions of the rail. The first and second gates may be opened, and the first and second interchangeable rail sections may each be pivoted about their connections to the gates, thus bringing the rail section with the top drive into an operating configuration. The gates may be closed and the lower fixed rail portion may be actuated to engage the first interchangeable rail section with the rail to form a continuous rail. The top drive may then be coupled to the traveling block for operations.

Devices, systems, and methods described herein may be used to readily clear the top drive from an operational area of a mast, such that operations may be performed without interference from the top drive. Moreover, devices, systems, and methods described herein may be used to arrange the top drive in a parked configuration outside the mast so as to allow access to the top drive for maintenance or other purpose. While maintenance is performed on the top drive while it is in a parked configuration outside the mast, other operations may continue within the operational area of the mast. The top drive may thus be cleared relatively quickly without a need to disassemble the top drive and without the need for cranes or other such heavy equipment.

In some embodiments, movements of the pivotable gates, interchangeable rail sections, lower fixed rail portion, and/or other components of the present disclosure may be controlled using a controller. In some embodiments, the controller may be configured to operate a particular encoded sequence of instructions in order to clear the top drive or otherwise to switch out two interchangeable rail sections between operating and parked configurations. In other embodiments, the controller may be configured to perform individual actions or control individual movements in response to user instructions.

It is further to be appreciated that interchangeable rail sections may be changed out for other purposes as well. For example, where one of the interchangeable rail sections requires maintenance, it may be moved from an operating configuration to a parked configuration, and a second interchangeable rail section may be arranged in the operating configuration. Additionally, where other equipment is arranged along the rail, such equipment may be positioned on an interchangeable rail section and moved with the rail section to a parked configuration as desired for maintenance or to clear the equipment from the operational area of the mast.

It is to be appreciated that at least one interchangeable rail section and/or gate of the present disclosure may be configured for supporting the deadload of the top drive in a parked configuration. In some embodiments, both rail sections of a pair of rail sections and/or their corresponding gates may be configured for supporting the top drive in a parked configuration. In other embodiments, one of the pair of rail sections and/or one of the gates may be configured for supporting the top drive. To support a top drive in a parked configuration, a gate may have added bracing, or a rail section may have added reinforced attachment mechanisms, for example.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an element may still actually contain such element as long as there is generally no significant effect thereof.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

Additionally, as used herein, the phrase "at least one of [X] and [Y]," where X and Y are different components that may be included in an embodiment of the present disclosure, means that the embodiment could include component X without component Y, the embodiment could include the component Y without component X, or the embodiment could include both components X and Y. Similarly, when used with respect to three or more components, such as "at least one of [X], [Y], and [Z]," the phrase means that the embodiment could include any one of the three or more components, any combination or sub-combination of any of the components, or all of the components.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

What is claimed is:

1. A system for clearing a top drive from an operational area of a vertically extending mast, the system comprising:
the top drive arranged on a top drive dolly;
a rail having a length and arranged within the operational area of the mast and configured for sliding engagement with the top drive dolly, the rail comprising:
a first interchangeable rail section pivotable about a first vertical axis between an operating configuration, where the first interchangeable rail section forms a portion of the length of the rail, and a parked configuration, where the first interchangeable rail section is removed from the rail; and a second interchangeable rail section pivotable about a second vertical axis between the operating configuration, where the second interchangeable rail section replaces the first interchangeable rail section to form the portion of the length, and the parked configuration, where the second interchangeable rail section is removed from the rail;

wherein at least one of the first and second interchangeable rail sections is configured for positioning the top drive in the parked configuration.

2. The system of claim 1, wherein the first and second interchangeable rail sections are configured such that for each rail section, in the parked configuration, the rail section is arranged outside of the operational area of the mast.

3. The system of claim 2, wherein for each interchangeable rail section, the parked configuration and the operating configuration are separated by an angle of between approximately 90 degrees and approximately 270 degrees.

4. The system of claim 1, wherein the rail further comprises a fixed portion and wherein the first and second interchangeable rail sections are configured such that for each rail section, in the operating configuration, the rail section is aligned with a fixed portion of the rail.

5. The system of claim 4, wherein each interchangeable rail section is configured to engage with the fixed portion of the rail.

6. The system of claim 4, wherein the fixed portion comprises an upper fixed portion and a lower fixed portion, and wherein each interchangeable rail section is configured to be arranged between the upper and lower fixed portions.

7. The system of claim 1, further comprising a pair of pivotable gates each configured to pivot between a closed configuration and an open configuration, wherein the first interchangeable rail section is arranged on a first pivotable gate, and wherein the second interchangeable rail section is arranged on a second pivotable gate.

8. The system of claim 7, wherein for each gate the open configuration and the closed configuration are separated by an angle of between approximately 45 degrees and approximately 135 degrees.

9. A method of clearing a top drive from an operational area of a vertically extending mast, the method comprising the steps of:
positioning the top drive on a first of two interchangeable rail sections of a rail having a length, the first rail section arranged in an operating configuration, where the first rail section forms a portion of the length and is engaged with a fixed portion of the rail;
disengaging the first rail section from the fixed portion of the rail;
arranging the first rail section in a parked configuration by pivoting the first rail section about a first vertical axis and arranging a second rail section of the two interchangeable rail sections in the operating configuration, where the second rail section replaces the first rail section to form the portion of the length, by pivoting the second rail section about a second vertical axis; and
engaging the second rail section with the fixed portion of the rail.

10. The method of claim 9, wherein arranging the first rail section in a parked configuration comprises pivoting the first rail section about a first axis, and wherein arranging the second rail section in the operating configuration comprises pivoting the second rail section about a second axis.

11. The method of claim 9, wherein each rail section is arranged on a pivotable gate, and wherein the method further comprises:
pivoting a first gate from a closed configuration to an open configuration, the first gate having the first rail section arranged thereon; and
pivoting a second gate from the closed configuration to the open configuration, the second gate having the second rail section arranged thereon.

12. The method of claim 11, further comprising pivoting the first and second gates from the open configuration to the closed configuration.

13. The method of claim 9, further comprising disconnecting the top drive from a traveling block.

14. The method of claim 9, wherein disengaging the first rail section from the fixed portion of the rail comprises actuating the fixed portion to create a gap between the first interchangeable rail section and the fixed portion of the rail.

15. The method of claim 14, wherein the fixed rail portion comprises an upper fixed portion and a lower fixed portion.

16. A drilling rig comprising:
a vertically extending mast defining an operational area;
a drill floor supporting the mast;
a rail arranged within the operational area of the mast and having a length, the rail comprising:
a first interchangeable rail section pivotable about a first vertical axis between an operating configuration, where the first interchangeable rail section forms a portion of the length of the rail, and a parked configuration, where the first interchangeable rail section is removed from the rail; and
a second interchangeable rail section pivotable about a second vertical axis between the operating configuration, where the second interchangeable rail section replaces the first interchangeable rail section to form the portion of the length, and the parked configuration, where the second interchangeable rail section is removed from the rail.

17. The drilling rig of claim 16, further comprising a drilling cable reeved through a crown block arranged on the mast and a traveling block, the traveling block configured to slidingly engage with the rail.

18. The drilling rig of claim 16 wherein the first and second interchangeable rail sections are configured such that for each rail section, in the parked configuration, the rail section is arranged outside of the operational area of the mast.

19. The drilling rig of claim 16, wherein the rail further comprises a fixed portion and wherein he first and second interchangeable rail sections are configured such that for each rail section, in the operating configuration, the rail section is aligned with a fixed portion of the rail.

20. The drilling rig of claim 16, wherein the mast comprising a pair of pivotable gates each configured to pivot between a closed configuration and an open configuration, wherein the first interchangeable rail section is arranged on a first pivotable gate, and wherein the second interchangeable rail section is arranged on a second pivotable gate.

\* \* \* \* \*